United States Patent
Patel et al.

(10) Patent No.: US 11,418,326 B2
(45) Date of Patent: Aug. 16, 2022

(54) METHOD AND SYSTEM FOR PERFORMING SECURE DATA TRANSACTIONS IN A DATA CLUSTER

(71) Applicant: Dell Products L.P., Hopkinton, MA (US)

(72) Inventors: Dharmesh M. Patel, Round Rock, TX (US); Rizwan Ali, Cedar Park, TX (US); Ravikanth Chaganti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 40 days.

(21) Appl. No.: 16/925,647

(22) Filed: Jul. 10, 2020

(65) Prior Publication Data

US 2021/0367770 A1    Nov. 25, 2021

(30) Foreign Application Priority Data

May 21, 2020 (IN) .............................. 202011021418

(51) Int. Cl.
*H04L 9/08* (2006.01)
*H04L 9/14* (2006.01)

(52) U.S. Cl.
CPC ............ *H04L 9/0822* (2013.01); *H04L 9/083* (2013.01); *H04L 9/0894* (2013.01); *H04L 9/14* (2013.01)

(58) Field of Classification Search
CPC combination set(s) only.
See application file for complete search history.

(56) References Cited

U.S. PATENT DOCUMENTS 4,780,809 A    10/1988 Woffinden et al.
5,689,678 A    11/1997 Stallmo et al.
(Continued)

FOREIGN PATENT DOCUMENTS

WO    2015114643 A1    8/2015

OTHER PUBLICATIONS

"Features—RoboHead"; Project Management Software for Marketing & Creative Teams, Aquent; 2018 (https://www.robohead.net/features) 1 page).
(Continued)

*Primary Examiner* — Abiy Getachew
(74) *Attorney, Agent, or Firm* — Chamberlain, Hrdlicka, White, Williams & Aughtry

(57) ABSTRACT

A method for securing data in a data cluster is performed by a data manager of a data cluster. The method includes receiving, by a data cluster, a write request for a user to write data to the data cluster, wherein the write request comprises an object identifier (OID) associated with data and a user identifier (UID) associated with the user; sending, to a key manager, an intermediate key request, wherein the intermediate key request comprises the UID; receiving, by the data cluster from the key manager, an intermediate key; processing the data to obtain a plurality of chunks and metadata associated with the plurality of chunks; generating an encryption key using the intermediate key and the OID; encrypting the metadata using the encryption key to generate encrypted metadata; deleting, after generating the encrypted metadata, the encryption key; and storing the encrypted metadata and the plurality of chunks in the data cluster.

18 Claims, 14 Drawing Sheets

(56) References Cited

U.S. PATENT DOCUMENTS

| | | |
|---|---|---|
| 6,098,098 A | 8/2000 | Sandahl et al. |
| 6,223,252 B1 | 4/2001 | Bandera et al. |
| 6,516,425 B1 | 2/2003 | Belhadj et al. |
| 7,636,814 B1 | 12/2009 | Karr et al. |
| 7,882,386 B1 | 2/2011 | Potnis et al. |
| 7,987,353 B2 | 7/2011 | Holdaway et al. |
| 8,037,345 B1 | 10/2011 | Iyer et al. |
| 8,099,571 B1 | 1/2012 | Driscoll et al. |
| 8,161,255 B2 | 4/2012 | Anglin et al. |
| 8,190,835 B1 | 5/2012 | Yueh |
| 8,364,917 B2 | 1/2013 | Bricker et al. |
| 8,386,930 B2 | 2/2013 | Dillenberger et al. |
| 8,583,769 B1 | 11/2013 | Peters et al. |
| 8,788,466 B2 | 7/2014 | Anglin et al. |
| 8,868,987 B2 | 10/2014 | Wagner |
| 8,874,892 B1 | 10/2014 | Chan et al. |
| 8,898,114 B1 | 11/2014 | Feathergill et al. |
| 8,949,208 B1 | 2/2015 | Xu et al. |
| 9,122,501 B1 | 9/2015 | Hsu et al. |
| 9,201,751 B1 | 12/2015 | Muthirisavenugopal et al. |
| 9,256,378 B2 | 2/2016 | Zheng et al. |
| 9,256,381 B1 | 2/2016 | Fultz et al. |
| 9,278,481 B2 | 3/2016 | Hull |
| 9,355,036 B2 | 5/2016 | Beard et al. |
| 9,521,198 B1 | 12/2016 | Agarwala et al. |
| 9,696,939 B1 | 7/2017 | Frank et al. |
| 9,710,367 B1 | 7/2017 | Nagineni |
| 9,749,480 B1 | 8/2017 | Katano |
| 9,792,316 B1 | 10/2017 | Cremelie |
| 9,830,111 B1 | 11/2017 | Patiejunas et al. |
| 9,898,224 B1 | 2/2018 | Marshak et al. |
| 10,002,048 B2 | 6/2018 | Chennamsetty et al. |
| 10,013,323 B1 | 7/2018 | Puhov et al. |
| 10,013,325 B1 | 7/2018 | Garrett, Jr. et al. |
| 10,031,672 B2 | 7/2018 | Wang et al. |
| 10,057,184 B1 | 8/2018 | Prahlad et al. |
| 10,091,295 B1 | 10/2018 | Savic et al. |
| 10,097,620 B2 | 10/2018 | Reddy et al. |
| 10,152,254 B1 | 12/2018 | Kang et al. |
| 10,185,624 B2 | 1/2019 | Akutsu et al. |
| 10,241,695 B2 | 3/2019 | Baptist et al. |
| 10,339,455 B1 | 7/2019 | Parush-Tzur et al. |
| 10,409,778 B1 | 9/2019 | Zhao et al. |
| 10,452,301 B1 | 10/2019 | Farhan |
| 10,503,413 B1 | 12/2019 | Gal et al. |
| 10,503,611 B1 | 12/2019 | Srivastav et al. |
| 10,528,429 B1 | 1/2020 | Vempati et al. |
| 10,817,392 B1 | 10/2020 | Mcauliffe et al. |
| 10,929,256 B2 | 2/2021 | Danilov et al. |
| 10,956,601 B2 * | 3/2021 | Surla ................ H04L 67/2828 |
| 10,963,345 B2 | 3/2021 | Patel et al. |
| 10,990,480 B1 | 4/2021 | Bernat et al. |
| 11,005,468 B1 | 5/2021 | Subramanian et al. |
| 11,112,990 B1 | 9/2021 | Bernat et al. |
| 2001/0044879 A1 | 11/2001 | Moulton et al. |
| 2003/0036882 A1 | 2/2003 | Harper et al. |
| 2003/0058277 A1 | 3/2003 | Bowman-Amuah |
| 2003/0065873 A1 | 4/2003 | Collins et al. |
| 2003/0172145 A1 | 9/2003 | Nguyen |
| 2003/0177205 A1 | 9/2003 | Liang et al. |
| 2004/0128587 A1 | 7/2004 | Kenchammana-Hosekote et al. |
| 2004/0153844 A1 | 8/2004 | Ghose et al. |
| 2004/0260967 A1 | 12/2004 | Guha et al. |
| 2005/0076049 A1 | 4/2005 | Qubti et al. |
| 2005/0086557 A1 | 4/2005 | Sato et al. |
| 2005/0182797 A1 | 8/2005 | Adkins et al. |
| 2005/0262385 A1 | 11/2005 | Mcneill et al. |
| 2005/0283655 A1 | 12/2005 | Ashmore |
| 2007/0214255 A1 | 9/2007 | Spitz et al. |
| 2007/0283011 A1 | 12/2007 | Rakowski et al. |
| 2008/0244204 A1 | 10/2008 | Cremelie et al. |
| 2009/0077165 A1 | 3/2009 | Rhodes et al. |
| 2009/0094250 A1 | 4/2009 | Dhuse et al. |
| 2009/0235022 A1 | 9/2009 | Bates et al. |
| 2009/0265360 A1 | 10/2009 | Bachwani et al. |
| 2010/0061207 A1 | 3/2010 | Trantham |
| 2010/0138604 A1 | 6/2010 | Noguchi et al. |
| 2010/0241616 A1 | 9/2010 | Murphy et al. |
| 2011/0099351 A1 | 4/2011 | Condict |
| 2011/0173484 A1 | 7/2011 | Schuette et al. |
| 2011/0197024 A1 | 8/2011 | Thomas |
| 2011/0246597 A1 | 10/2011 | Swanson et al. |
| 2012/0096309 A1 | 4/2012 | Kumar et al. |
| 2013/0047029 A1 | 2/2013 | Ikeuchi et al. |
| 2013/0067459 A1 | 3/2013 | Sannidhanam et al. |
| 2013/0086006 A1 | 4/2013 | Colgrove |
| 2013/0151683 A1 | 6/2013 | Jain et al. |
| 2013/0339818 A1 | 12/2013 | Baker et al. |
| 2014/0020083 A1 | 1/2014 | Fetik |
| 2014/0032834 A1 | 1/2014 | Cudak et al. |
| 2014/0059311 A1 | 2/2014 | Oberhofer et al. |
| 2014/0089265 A1 | 3/2014 | Talagala et al. |
| 2014/0089630 A1 | 3/2014 | Pignatelli |
| 2014/0282824 A1 | 9/2014 | Lango et al. |
| 2014/0285917 A1 | 9/2014 | Cudak et al. |
| 2014/0297603 A1 | 10/2014 | Kim et al. |
| 2015/0012775 A1 | 1/2015 | Cudak et al. |
| 2015/0046756 A1 | 2/2015 | Sreekumaran et al. |
| 2015/0058582 A1 | 2/2015 | Baldwin et al. |
| 2015/0095596 A1 | 4/2015 | Yang |
| 2015/0161000 A1 | 6/2015 | Kim et al. |
| 2015/0205657 A1 | 7/2015 | Clark |
| 2015/0205669 A1 | 7/2015 | Sundaram et al. |
| 2015/0220400 A1 | 8/2015 | Resch et al. |
| 2015/0227602 A1 | 8/2015 | Ramu et al. |
| 2015/0286545 A1 | 10/2015 | Brown |
| 2015/0355980 A1 | 12/2015 | Volvovski et al. |
| 2016/0013988 A1 * | 1/2016 | Andrews ................ H04L 41/12 709/223 |
| 2016/0057226 A1 | 2/2016 | Bestler et al. |
| 2016/0062674 A1 | 3/2016 | Benight et al. |
| 2016/0070652 A1 | 3/2016 | Sundararaman et al. |
| 2016/0077933 A1 | 3/2016 | Ventura et al. |
| 2016/0085630 A1 | 3/2016 | Gardner |
| 2016/0170871 A1 | 6/2016 | Hyun et al. |
| 2016/0246537 A1 | 8/2016 | Kim |
| 2016/0313916 A1 | 10/2016 | Sivananainthaperumal et al. |
| 2017/0090767 A1 | 3/2017 | Poston et al. |
| 2017/0099187 A1 | 4/2017 | Dale et al. |
| 2017/0147437 A1 | 5/2017 | Borlick et al. |
| 2017/0160983 A1 | 6/2017 | Fiske et al. |
| 2017/0192865 A1 | 7/2017 | Pan |
| 2017/0192868 A1 | 7/2017 | Vijayan et al. |
| 2017/0199893 A1 | 7/2017 | Aronovich et al. |
| 2017/0201545 A1 | 7/2017 | Nicodemus et al. |
| 2017/0206034 A1 | 7/2017 | Fetik |
| 2017/0235609 A1 | 8/2017 | Wires et al. |
| 2017/0262185 A1 | 9/2017 | Long et al. |
| 2017/0308436 A1 | 10/2017 | Agombar et al. |
| 2018/0018227 A1 | 1/2018 | Kazi |
| 2018/0018235 A1 | 1/2018 | Arslan et al. |
| 2018/0060894 A1 | 3/2018 | Beveridge et al. |
| 2018/0101305 A1 | 4/2018 | Kazi et al. |
| 2018/0157532 A1 | 6/2018 | Kumar et al. |
| 2018/0165169 A1 | 6/2018 | Camp et al. |
| 2018/0189109 A1 | 7/2018 | Nagai et al. |
| 2018/0205785 A1 | 7/2018 | Caulfield et al. |
| 2018/0217898 A1 | 8/2018 | Tormasov |
| 2018/0260123 A1 | 9/2018 | Andresen et al. |
| 2018/0278597 A1 | 9/2018 | Helms et al. |
| 2018/0284987 A1 * | 10/2018 | Lazier .................. G06F 3/0613 |
| 2018/0285881 A1 | 10/2018 | Maung |
| 2018/0307560 A1 | 10/2018 | Vishnumolakala et al. |
| 2018/0314607 A1 | 11/2018 | Deshpande et al. |
| 2018/0322558 A1 | 11/2018 | Padmanabh et al. |
| 2018/0356998 A1 | 12/2018 | Wu et al. |
| 2019/0050263 A1 | 2/2019 | Patel et al. |
| 2019/0104398 A1 | 4/2019 | Owen et al. |
| 2019/0108099 A1 | 4/2019 | Mazumdar |
| 2019/0109772 A1 | 4/2019 | Lipstone et al. |
| 2019/0197023 A1 | 6/2019 | Chennamsetty et al. |
| 2019/0332473 A1 | 10/2019 | Yang et al. |
| 2019/0332502 A1 | 10/2019 | Ma et al. |
| 2019/0361850 A1 | 11/2019 | Uno et al. |

(56) References Cited

U.S. PATENT DOCUMENTS

| | | |
|---|---|---|
| 2019/0379588 A1 | 12/2019 | Rao |
| 2020/0026439 A1 | 1/2020 | Gao et al. |
| 2020/0034257 A1 | 1/2020 | Mahmood et al. |
| 2020/0042388 A1 | 2/2020 | Roberts |
| 2020/0050689 A1 | 2/2020 | Tal et al. |
| 2020/0065191 A1 | 2/2020 | Zhou |
| 2020/0133503 A1 | 4/2020 | Sun et al. |
| 2020/0175038 A1* | 6/2020 | Guan .................. G06F 16/288 |
| 2020/0201837 A1* | 6/2020 | Motwani ............... G06F 16/381 |
| 2020/0257457 A1 | 8/2020 | Matsugami et al. |

OTHER PUBLICATIONS

"Make more time for the work that matters most"; Asana, Inc.; 2017 (https://asana.com/) (7 pages).
"Online Project Management Tools & Features"; ProWorkflow; Jun. 2015 (https://www.proworkflow.com/features-project-management-tools/) (7 pages).
Extended European Search Report issued in corresponding European Application No. 20152194.5, dated Jun. 29, 2020 (10 pages).
Extended European Search Report issued in corresponding European Application No. 20152195.2, dated Jun. 2, 2020 (6 pages).
Suzhen Wu et al. ; "Improving Reliability of Deduplication-based Storage Systems with Per-File Parity"; 2018 IEEE 37th International Symposium on Reliable Distributed Systems (SRDS); Salvador, Brazil; 2018; pp. 171-180 (DOI:10.1109/SRDS.2018.00028) (10 pages).

* cited by examiner

METHOD AND SYSTEM FOR PERFORMING SECURE DATA TRANSACTIONS IN A DATA CLUSTER

BACKGROUND

Computing devices may include any number of internal components such as processors, memory, and persistent storage. Each of the internal components of a computing device may be used to generate data. The generated data may be encrypted to secure the data. The process of generating data, storing data, and encrypting data may utilize computing resources of the computing devices such as processing and storage.

SUMMARY

In general, in one aspect, the invention relates to a method for securing data in a data cluster. The method includes receiving, by a data cluster, a write request for a user to write data to the data cluster, wherein the write request comprises an object identifier (OID) associated with data and a user identifier (UID) associated with the user, sending, to a key manager, an intermediate key request, wherein the intermediate key request comprises the UID, receiving, by the data cluster from the key manager, an intermediate key, processing the data to obtain a plurality of chunks and metadata associated with the plurality of chunks, generating an encryption key using the intermediate key and the OID, encrypting the metadata using the encryption key to generate encrypted metadata, deleting, after generating the encrypted metadata, the encryption key, and storing the encrypted metadata and the plurality of chunks in the data cluster.

In general, in one aspect, the invention relates to a system that includes a processor and a data processor for securing data in a data cluster. The data processor receives, by a data cluster, a write request for a user to write data to the data cluster, wherein the write request comprises an object identifier (OID) associated with data and a user identifier (UID) associated with the user, sends, to a key manager, an intermediate key request, wherein the intermediate key request comprises the UID, receiving, by the data cluster from the key manager, an intermediate key, processes the data to obtain a plurality of chunks and metadata associated with the plurality of chunks, generates an encryption key using the intermediate key and the OID, encrypts the metadata using the encryption key to generate encrypted metadata, deletes, after generating the encrypted metadata, the encryption key, and stores the encrypted metadata and the plurality of chunks in the data cluster.

In general, in one aspect, the invention relates to a non-transitory computer readable medium which includes computer readable program code, which when executed by a computer processor enables the computer processor to perform a method. The method includes receiving, by a data cluster, a write request for a user to write data to the data cluster, wherein the write request comprises an object identifier (OID) associated with data and a user identifier (UID) associated with the user, sending, to a key manager, an intermediate key request, wherein the intermediate key request comprises the UID, receiving, by the data cluster from the key manager, an intermediate key, processing the data to obtain a plurality of chunks and metadata associated with the plurality of chunks, generating an encryption key using the intermediate key and the OID, encrypting the metadata using the encryption key to generate encrypted metadata, deleting, after generating the encrypted metadata, the encryption key, and storing the encrypted metadata and the plurality of chunks in the data cluster.

DETAILED DESCRIPTION

Figure 1A:
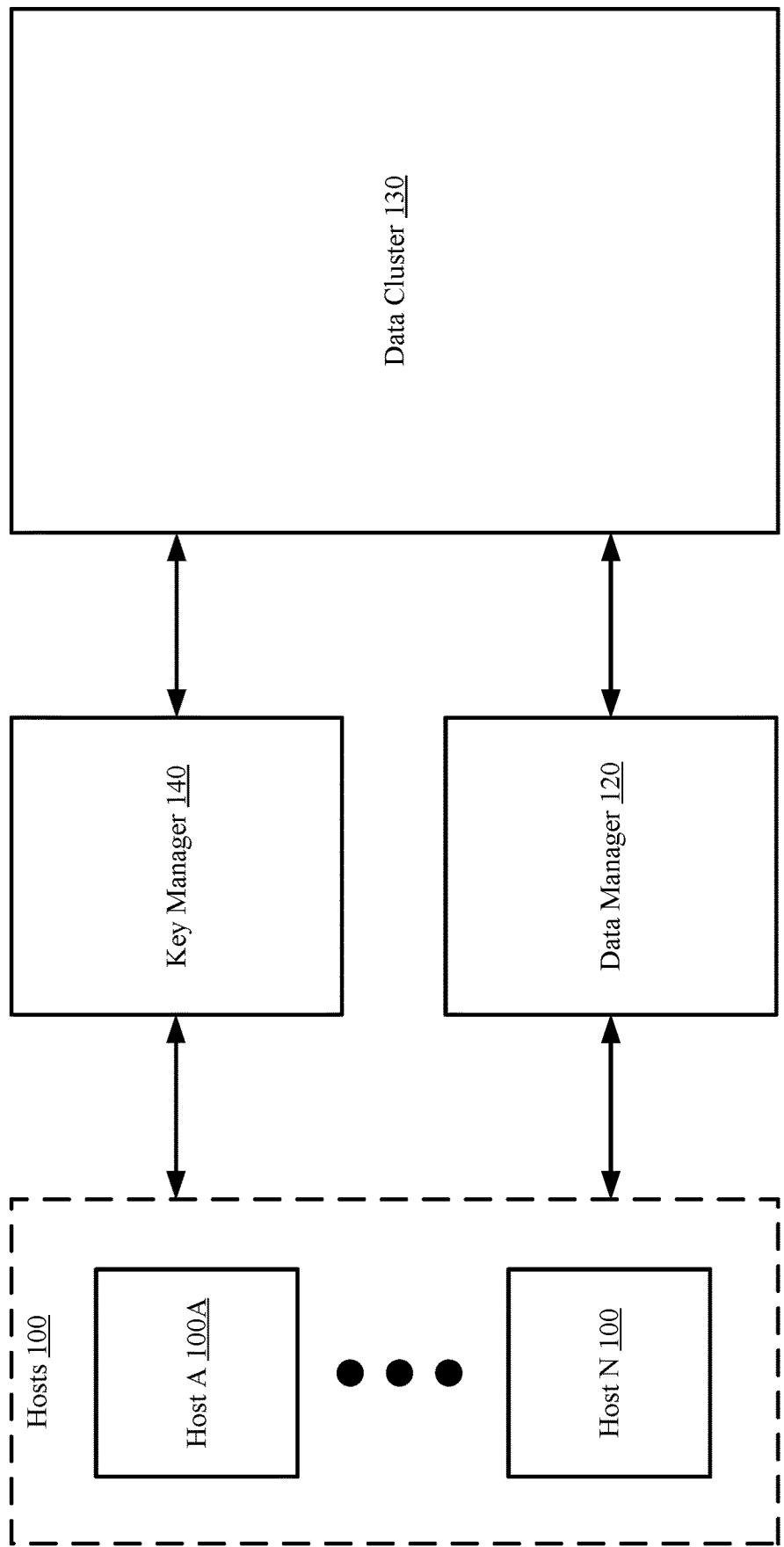
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for securing data stored in a data cluster. More specifically, embodiments of the invention relate to encrypting metadata associated with data stored in the data cluster using encryption keys. Therefore, data stored in the data cluster may not be accessed without decrypting metadata associated with the data. The encryption of metadata rather than data may provide an increased efficiency in storing and providing secured data in the data cluster. Further, the encryption keys may be generated using intermediate keys and data object identifiers associated with user data objects. The intermediate keys may be generated using one or more user keys associated with users of hosts and data cluster keys associated with a data cluster. The intermediate keys may mitigate the sharing of user keys and data cluster keys, improving the security of the data stored in the data cluster.

FIG. 1A shows an example system in accordance with one or more embodiments of the invention. The system may include one or more hosts (100), a key manager (140), a data manager (120), and a data cluster (130), each may be operatively connected. The system may include other and/or additional components without departing from the invention. Each of the illustrated components is described below.

In one or more embodiments of the invention, the hosts (100) utilize the data cluster (130) to store data. The data stored may be backups of databases, files, applications, and/or other types of data without departing from the invention. Each host (e.g., 100A, 100N) may include any number of users (not shown). Each user of the hosts (100) may utilize the key manager (140) to generate and maintain user keys and data cluster keys and generate and provide intermediate keys using the user keys and data cluster keys. The hosts (100) may send and/or receive data and/or requests to and from the data manager (120), which may maintain metadata associated with the data and generate and assign object identifiers.

Figure 5:
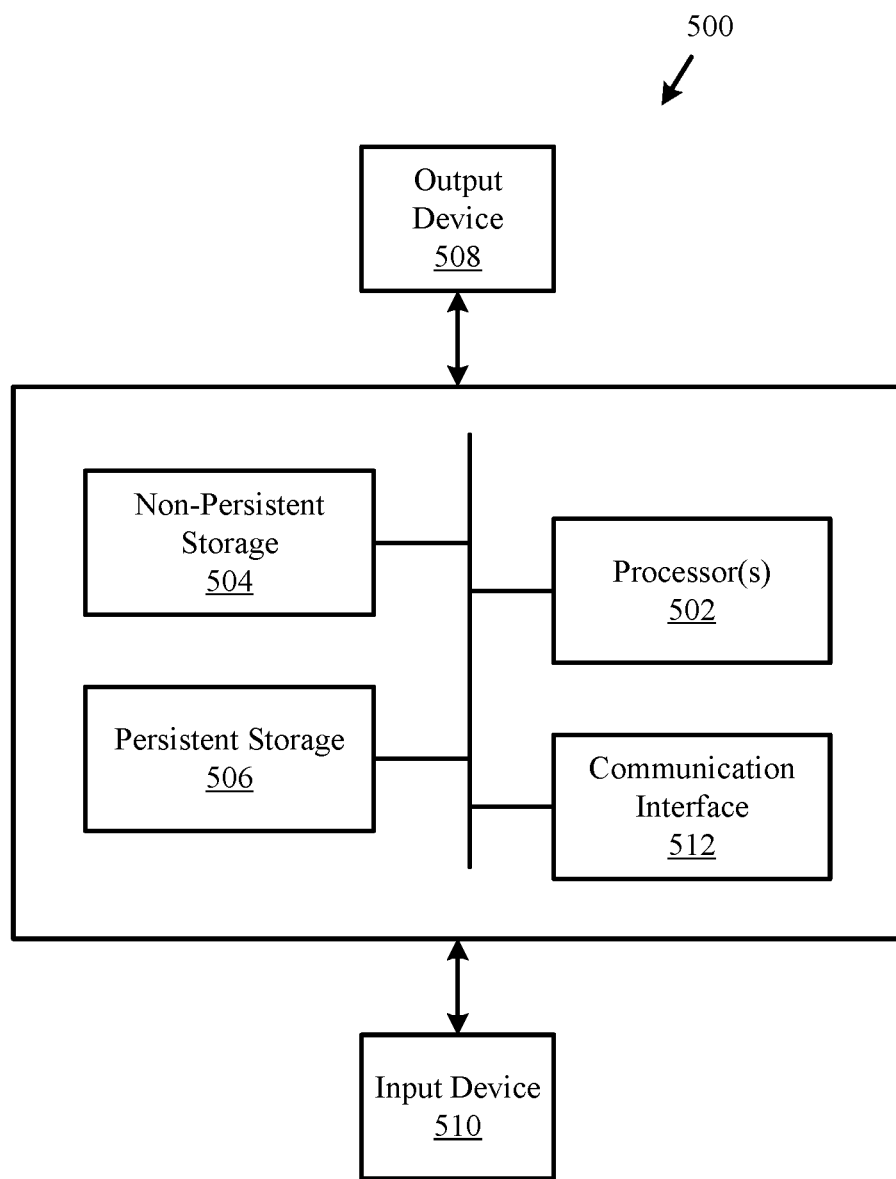
FIG. 5 shows a computing system in accordance with one or more embodiments of the invention.

In one or more embodiments of the invention, the hosts (100) are implemented as computing devices (see e.g., FIG. 5). The computing devices may be, for example, laptop computers, desktop computers, servers, distributed computing systems, or cloud resources (e.g., third-party storage systems accessible via wired or wireless connection). The computing devices may include one or more processors, memory (e.g., random access memory), and persistent storage (e.g., disk drives, solid state drives, etc.). The computing devices may include instructions, stored on the persistent storage, that when executed by the processor(s) of the computing devices cause the computing devices to perform the functionality of the hosts (100) described throughout this application.

In one or more embodiments of the invention, the hosts (100) are implemented as logical devices. The logical devices may utilize the computing resources of any number of computing devices and thereby provide the functionality of the hosts (100) described throughout this application.

In one or more embodiments of the invention, the key manager (140) generates and maintains keys used by the data cluster (130) to generate encryption keys. The keys may be user keys and/or data cluster keys. The key manager (140) may associate user keys with users of hosts and data cluster keys with data clusters. The key manager (140) may include any number of keys associated with users of the system and the data cluster (130). The key manager (140) may include keys associated with additional data clusters (not shown) without departing from the invention. The key manager (140) may generate intermediate keys, which may be ephemeral, using one or more user keys and data cluster keys. For additional information regarding the key manager (140) refer to FIG. 1C.

In one or more embodiments of the invention, the key manager (140) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the key manager (140) described throughout this application.

In one or more embodiments of the invention, the key manager (140) is implemented as a logical device. The logical device may utilize the computing resources of any number of computing devices and thereby provide the functionality of the key manager (140) described throughout this application. For additional information regarding the key manager (140), refer to FIG. 1C.

In one or more embodiments of the invention, the data manager (120) is a device (physical or logical) that includes the functionality to maintain metadata of all data generated by hosts (100) and stored in the data cluster (130). Additionally, the data manager (120) manages read, write, and update requests from the hosts (100). The data manager may generate and/or assign object identifiers (also referred to as OIDs or object IDs) for data objects generated by users of hosts (100) and stored in the data cluster (130). For additional information regarding the data manager (120), refer to FIG. 1D.

In one or more embodiments of the invention, the data manager (120) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data manager (120) described throughout this application.

In one or more embodiments of the invention, the data manager (120) is implemented as a logical device. The logical device may utilize the computing resources of any number of computing devices and thereby provide the functionality of the data manager (120) described throughout this application.

In one or more embodiments of the invention, the data cluster (130) stores data, and/or backups of data generated by the hosts (100). The data and/or backups may be deduplicated versions of data obtained from the host (100) obtained via data deduplication. The data cluster (130) may, via an erasure coding operation, store portions of the deduplicated data across data nodes operating in the data cluster (130). One or more components of the data cluster (130) (see e.g., FIG. 1B) may include the functionality to perform data deduplication and undeduplication, and erasure coding.

In one or more embodiments of the invention, the data cluster (130) generates, encrypts, and decrypts metadata of data generated by users of hosts (100). The metadata may include storage metadata and/or object metadata. The data cluster (130) may obtain intermediate keys from the key manager (140) and may generate encryption keys using the obtained intermediate keys and/or other information without departing from the invention. The encryption keys may be used by the data cluster (130) to encrypt and/or decrypt metadata associated with data generated by the hosts (100). For additional information regarding the data cluster (130), refer to FIG. 1B.

As used herein, deduplication refers to methods of storing only portions of files (also referred to as file segments or segments) that are not already stored in persistent storage. For example, when multiple versions of a large file, having only minimal differences between each of the versions, are stored without deduplication, storing each version will require approximately the same amount of storage space of a persistent storage. In contrast, when the multiple versions of the large file are stored with deduplication, only the first version of the multiple versions stored will require a substantial amount of storage. Once the first version is stored in the persistent storage, the subsequent versions of the large file subsequently stored will be de-duplicated before being stored in the persistent storage resulting in much less storage space of the persistent storage being required to store the subsequently stored versions when compared to the amount of storage space of the persistent storage required to store the first stored version. Undeduplication refers to methods of restoring files which were deduplicated using the portions of files stored in persistent storage.

In one or more embodiments of the invention, an erasure coding procedure includes dividing the obtained data into portions, referred to as data chunks. Each data chunk may include any number of data segments associated with the obtained data. The individual data chunks may then be combined (or otherwise grouped) into data slices (also referred to as Redundant Array of Independent Disks (RAID) slices). One or more parity values are then calculated for each of the aforementioned slices. The number of parity values may vary based on the erasure coding algorithm that is being used as part of the erasure coding procedure. The chunks of a data slice may then be stored across different fault domains in a data cluster. Any chunk within a data slice may be reconstructed using the other chunks in the data slice. Non-limiting examples of erasure coding algorithms are RAID-3, RAID-4, RAID-5, and RAID-6. Other erasing coding algorithms may be used without departing from the invention.

Continuing with the discussion of FIG. 1A, the data cluster (130) may include persistent storage devices found within data nodes that each store any number of portions of data. The portions of data may be obtained by other persistent storage devices, data nodes, the host (100) the data manager (120), and (130). For additional details regarding the data cluster (130), see, e.g., FIG. 1B.

Figure 1B:
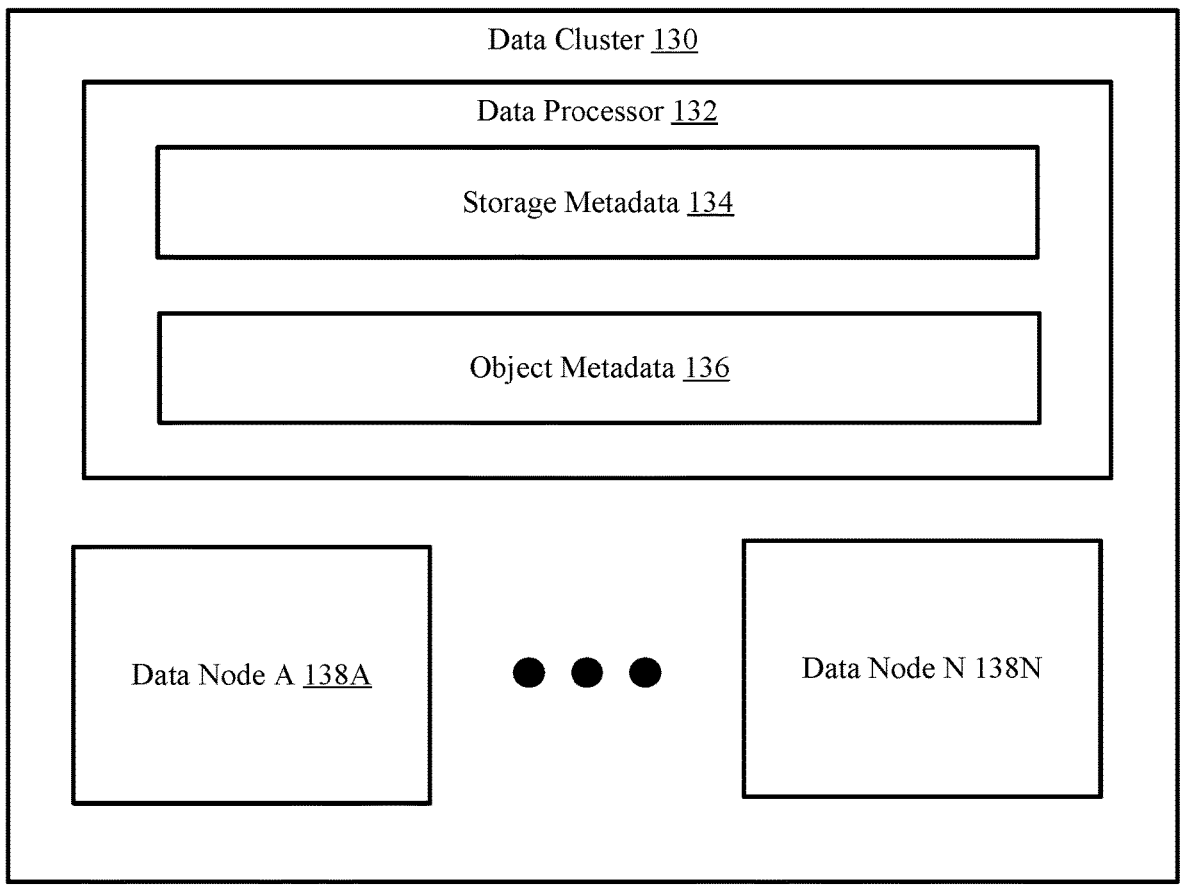
FIG. 1B shows a diagram of a data cluster in accordance with one or more embodiments of the invention.

FIG. 1B shows a diagram of a data cluster in accordance with one or more embodiments of the invention. The data cluster (130) may be an embodiment of the data cluster (130, FIG. 1A) discussed above. The data cluster (130) may include a data processor (132), and any number of data nodes (138A, 138N). The components of the data cluster (130) may be operably connected via any combination of wired and/or wireless connections. Each of the aforementioned components is discussed below. The data cluster (130) may include other and/or additional components without departing from the invention.

In one or more embodiments of the invention, the data processor (132) is a device (physical or logical) that includes the functionality to perform deduplication, undeduplication, and erasure coding on data obtained from a host (e.g., 100, FIG. 1A) and manage the storage, maintenance, and supply of the resulting processed data in to the persistent storage devices of data nodes (138A, 138N) in the data cluster (130). The data processor (132) may generate, utilize, update, and/or storage metadata (134) and object metadata (136) as part of its storage management and data processing functionality. The data processor (132) may send the storage metadata (136) to the data manager (120, FIG. 1A). For additional information regarding the storage metadata (134) and the object metadata (136), refer to FIG. 2A and FIG. 2B respectively.

In one or more embodiments of the invention, the data processor (132) includes the functionality to encrypt and decrypt storage metadata (134) and/or object metadata (136) associated with data stored in the data cluster (130). The data processor (132) may use intermediate keys obtained from the key manager (140), object identifiers obtained from the data manager (120), and a cryptographic algorithm to generate encryption keys to encrypt and decrypt metadata associated with the user data objects. For additional information regarding the storage management of data generated by the hosts (100) and the encryption of metadata associated with the data, refer to FIGS. 3A-3C.

Figure 3A:
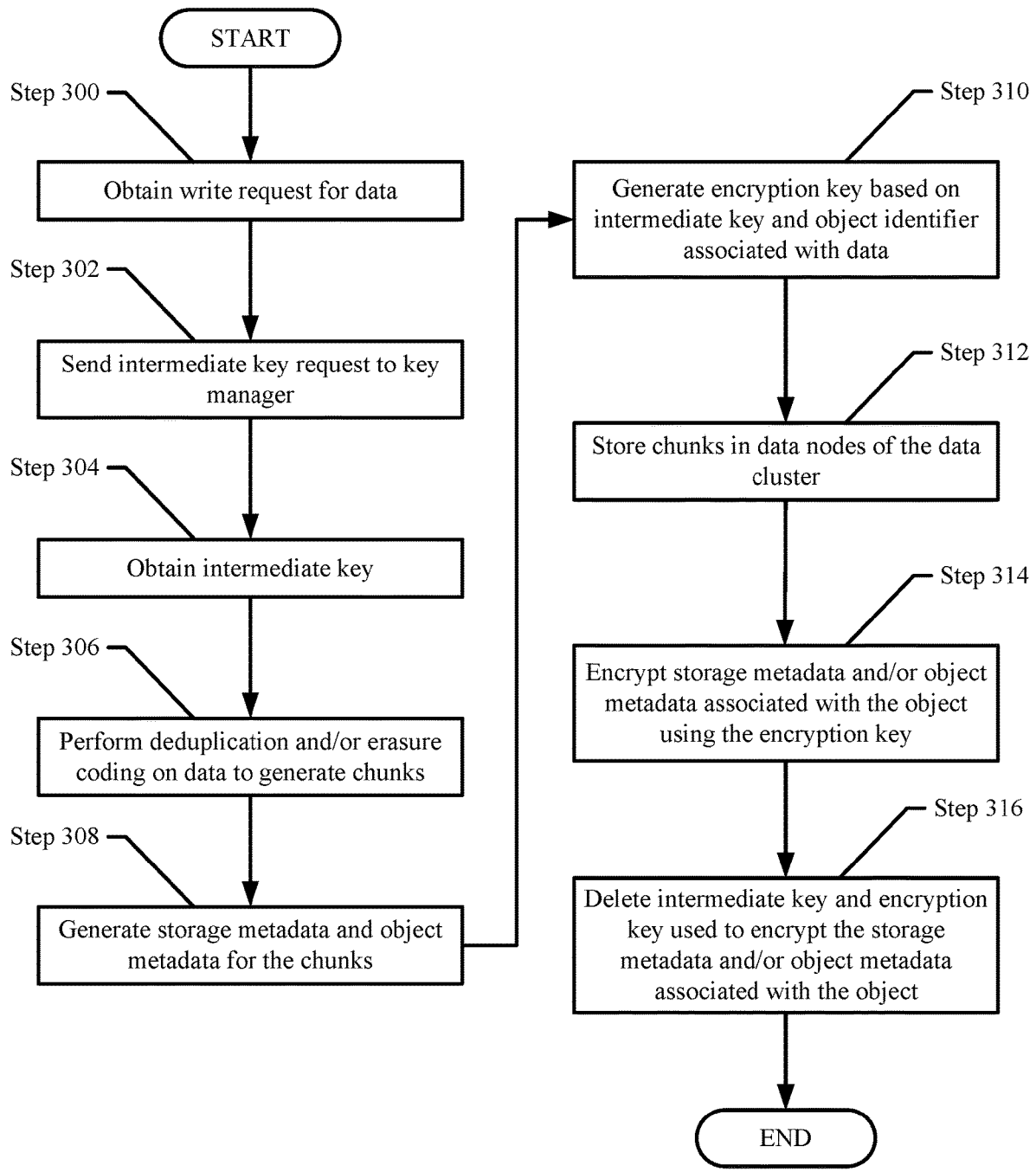
FIG. 3A shows a flowchart for storing data in accordance with one or more embodiments of the invention.
Figure 3B:
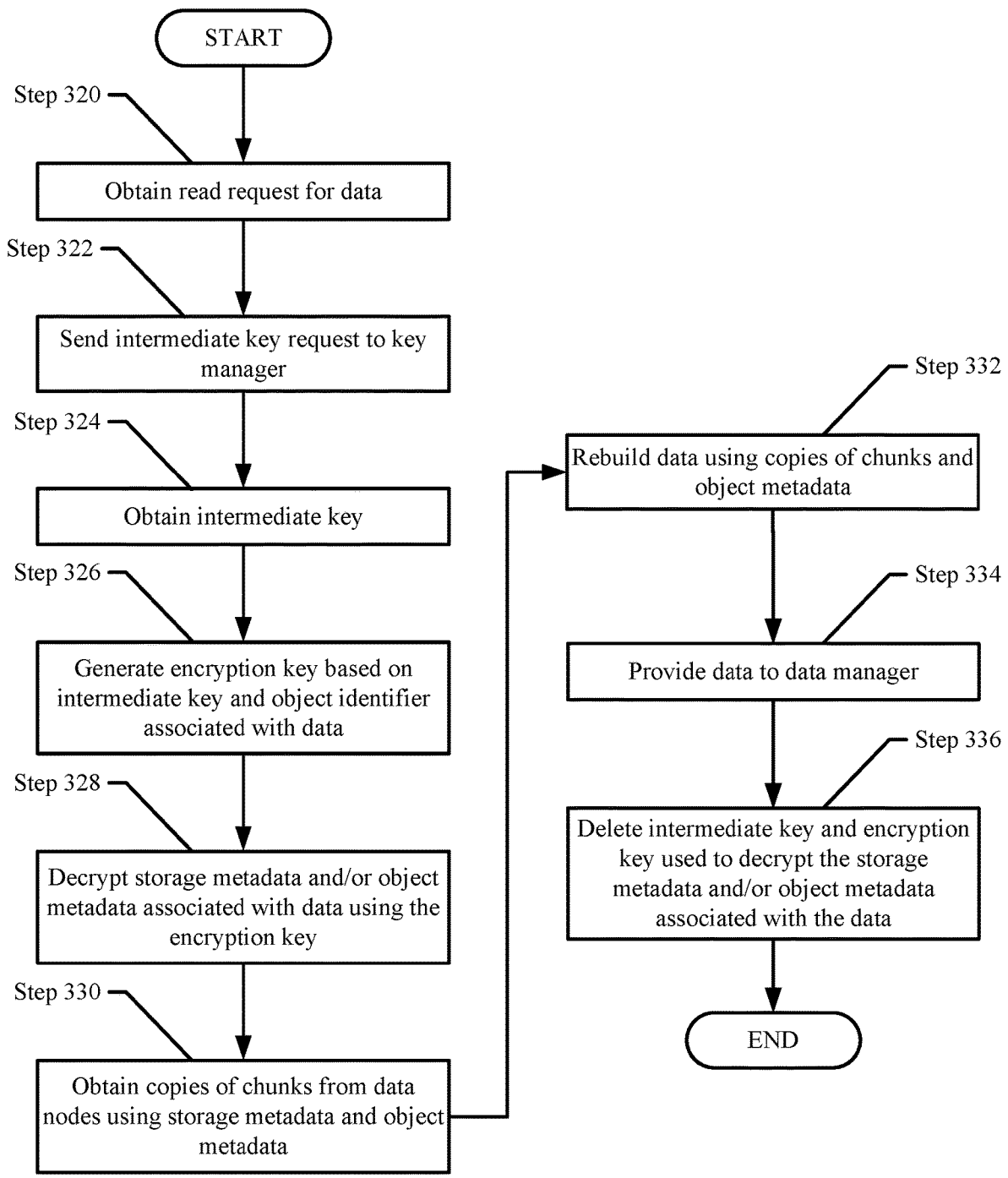
FIG. 3B shows a flowchart for providing data in accordance with one or more embodiments of the invention.
Figure 3C:
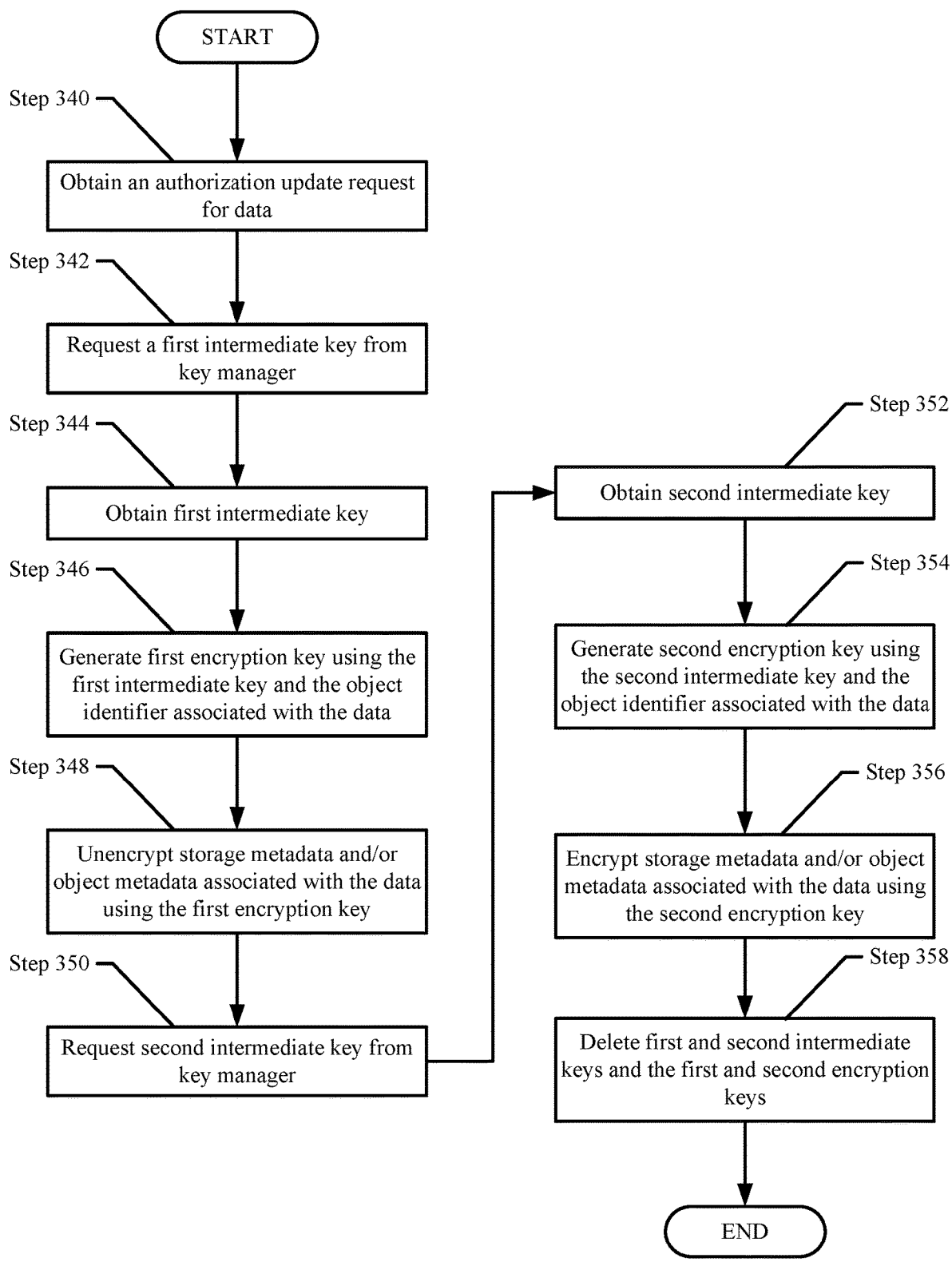
FIG. 3C shows a flowchart for updating authentication information in accordance with one or more embodiments of the invention.

In one or more of embodiments of the invention, the data processor (132) is implemented as computer instructions, e.g., computer code, stored on a persistent storage that when executed by a processor on a data node in a data cluster (e.g., 130) cause the data cluster (130) to provide the aforementioned functionality of the data processor (132) described throughout this application and/or all, or a portion thereof, of the methods illustrated in FIGS. 3A-3C.

In one or more embodiments of the invention, the data processor (132) is implemented as a computing device (see e.g., FIG. 5) that is within the data cluster but is separate from the data nodes. The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data processor (120) described throughout this application and/or all, or a portion thereof, of the methods illustrated in FIGS. 3A-3C.

In one or more embodiments of the invention, the data processor (132) is implemented as a logical device. The logical device may utilize the computing resources of any number of computing devices and thereby provide the functionality of the data processor (132) described throughout this application and/or all, or a portion thereof, of the methods illustrated in FIGS. 3A-3C.

In one or more embodiments of the invention, the data nodes (138A, 138N) store data chunks and parity chunks (as described below). The data nodes (138A, 138N) may include persistent storage devices (e.g., 174A, 174N, FIG. 1E) that may be used to store the data chunks, parity chunks, storage metadata (134), and object metadata (136). The management of the data chunks and parity chunks is described below with respect to FIGS. 3A-3C. For additional details regarding the data nodes (130A, 130N), see, e.g., FIG. 1E.

In one or more embodiments of the invention, each data node (138A, 138N) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data node (138A, 138N) described throughout this application.

In one or more embodiments of the invention, each of the data nodes (138A, 138N) is implemented as a logical device. The logical device may utilize the computing resources of any number of computing devices and thereby provide the functionality of the data nodes (138A, 138N) described throughout this application. For additional details regarding the data nodes (138A, 138N), see, e.g., FIG. 1E.

Figure 1C:
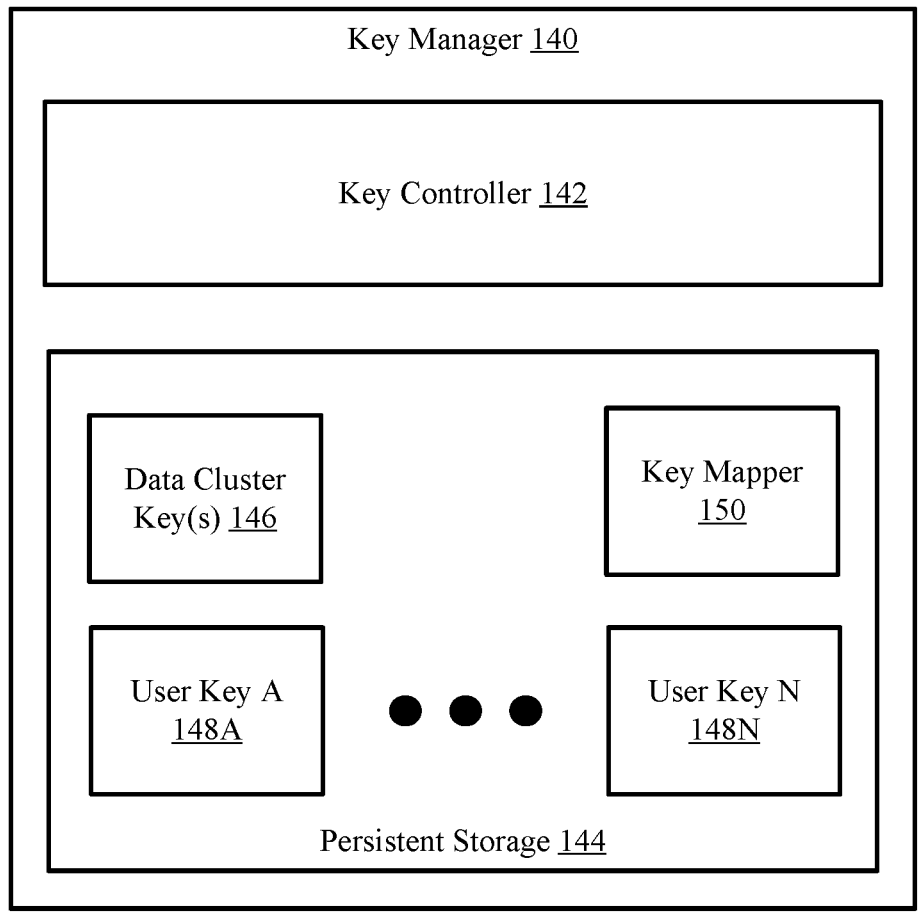
FIG. 1C shows a diagram of a key manager in accordance with one or more embodiments of the invention.

FIG. 1C shows a diagram of a key manager in accordance with one or more embodiments of the invention. The key manager (140) may be an embodiment of the key manager (140, FIG. 1A) discussed above. The key manager (140) may include a key controller (142) and persistent storage (144). The components of the key manager (140) may be operably connected via any combination of wired and/or wireless connections. Each of the aforementioned components is discussed below. The key manager (140) may include other and/or additional components without departing from the invention.

In one or more embodiments of the invention, the key controller (142) is a device (physical or logical) that includes the functionality to generate and maintain data cluster key(s) (146) and user key(s) (e.g., 148A, 148N) for users of hosts (100, FIG. 1A) using a cryptographic algorithm Additionally, in one or more embodiments of the invention, the key controller (142) uses the user keys (e.g., 148A, 148N), data cluster key(s) (146), and a cryptographic algorithm to generate intermediate keys (not shown). A cryptographic algorithm may be one or more mathematical instructions used to encrypt or decrypt data. The key manager (140) may provide the intermediate keys to the data processor (132) of the data cluster (130) in order to encrypt user data associated with the users and data cluster (130, FIG. 1A). The key controller (142) may generate and/or update a key mapper that associates users with user keys (e.g., 148A, 148N) and data clusters (e.g., 130, FIG. 1A) with the data cluster key(s). The key controller (142) may include other and/or additional functionality without departing from the invention.

In one or of embodiments of the invention, the key controller (142) is implemented as computer instructions, e.g., computer code, stored on a persistent storage that when executed by a processor of a key manager (e.g., 140) cause the key manager (140) to provide the aforementioned functionality of the key controller (142) described throughout this application and/or all, or a portion thereof, of the methods illustrated in FIGS. 3A-3C.

In one or more embodiments of the invention, the key controller (142) is implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the key controller (142) described throughout this application and/or all or a portion of the methods illustrated in FIGS. 3A-3C. The key controller (142) may be implemented using another type of physical device without departing from the invention.

In one or more embodiments of the invention, the persistent storage (144) stores data. The data may include one or more data structures. The data may include cluster key(s) (146), user keys (e.g., 148A, 148N), and a key mapper (150). The persistent storage (144) may store other and/or additional data without departing from the invention. The persistent storage (144) may be non-volatile storage. In other words, the data stored in the persistent storage (144) is not lost or removed when the persistent storage (144) loses power. The persistent storage (144) may be implemented using physical storage devices and/or logical storage devices.

The persistent storage (144) may be implemented using a physical storage. The physical storage may include any combination of hard disk drives, solid state disk drives, tape drives, and/or any other physical storage mediums for the storage of data. The persistent storage (144) may be another type of physical storage without departing from the invention.

The persistent storage (144) may be implemented using a logical storage (e.g., virtualized storage) that utilizes any quantity of hardware storage resources of any number of computing devices for storing data. For example, the persistent storage (144) may utilize portions of any combination of hard disk drives, solid state disk drives, tape drives, and/or any other physical storage medium of any number of computing devices. The persistent storage (144) may be another type of storage without departing from the invention.

As discussed above, the persistent storage may store a data cluster key(s) (146), one or more user keys (e.g., 148A, 148N), and a key mapper (150). The persistent storage (144) may store other and/or additional information without departing from the invention. Each of these data structures is discussed below.

In one or more embodiments of the invention, a data cluster key (146) is one or more data structures that include a unique code that is associated with a data cluster that is only known and possessed by the key manager (140). The unique code may be a unique bit string or character string. As discussed above, the system may include one or more data clusters (130, FIG. 1A) that store user data. Each data cluster (e.g., 130, FIG. 1A) may have a unique data cluster key (146). When a data cluster (e.g., 130, FIG. 1A) registers with the key manager (140), the key controller (142) may generate a data cluster key (146) using a cryptographic algorithm and associate the data cluster key (146) with the data cluster (e.g., 130, FIG. 1A) using a data cluster identifier. The data cluster key(s) (146) may be used by the key controller (142) to generate intermediate keys. The data cluster key(s) (146) may include other and/or additional information and may be used for other and/or additional purposes without departing from the invention.

In one or more embodiments of the invention, a user key (e.g., 148A, 148N) is one or more data structures that include a unique code that is associated with a user that is only known and possessed by the key manager (140). The unique code may be a unique bit string or character string. As discussed above, the system may include one or more users that generate and access user data that is stored in the data cluster (130, FIG. 1A). Each user may have a unique user key (e.g., 148A, 148N). When a user of a host (e.g., 100A, FIG. 1A) registers with the key manager (140), the key controller (142) may generate a unique user key (e.g., 148A) using a cryptographic algorithm and associate the user key (e.g., 148A) with the user using a user identifier. The user keys (e.g., 148A, 148N) may be used by the key controller (142) generate intermediate keys. The user keys (148A, 148N) may include other and/or additional information and may be used for other and/or additional purposes without departing from the invention.

In one or more embodiments of the invention, a key mapper (150) is one or more data structures that associates users with user keys (148A, 148N) and data clusters with data cluster key(s) (146). The key mapper (150) may include one or more user identifiers and the user key (e.g., 148A) that is associated with the user identifiers. The key mapper (150) may also include one or more data cluster (e.g., 130, FIG. 1A) identifiers and the data cluster key(s) (146) associated with the data cluster identifiers. The key controller (140) may update the key mapper (150) each time a user key (e.g., 148A) or a data cluster key(s) is generated. The key controller (142) may user the key mapper (150) to identify user keys (e.g., 148A, 148N) that are associated with specific users and to identify data cluster key(s) (146) that are associated with specific data clusters (e.g., 130, FIG. 1A). The key mapper (150) may include other and/or additional information and may be used for other and/or additional purposes without departing from the invention.

In one or more embodiments of the invention, an intermediate key (not shown) is one or more data structures that include a unique code that is associated with one or more users and a data cluster. The unique code may be a unique bit string or character string. As discussed above, the key manager (140), upon request, may generate intermediate keys and provide them to the data processor (132, FIG. 1B) to generate encryption keys to prevent the sharing of user keys and data cluster keys. The intermediate key may be generated using one or more user keys, a data cluster key, and a cryptographic algorithm. The intermediate keys are not stored in persistent storage (144) to increase the security of data associated with the intermediate keys. Each encryption key may be generated using a unique intermediate key. The intermediate keys may include other and/or additional information and may be used for other and/or additional purposes without departing from the invention.

In one or more embodiments of the invention, an encryption key (not shown) is one or more data structures that include a unique code that is associated with a user data object. The unique code may be a unique bit string or character string. As discussed above, the system may include one or more users that generate and access user data objects that are stored in the data cluster (130, FIG. 1A). Each user data object may be encrypted and decrypted with a unique encryption key. The data processor (132, FIG. 1B) may generate encryption keys using an intermediate key, an object identifier, and a cryptographic algorithm. The encryption keys may include other and/or additional information and may be used for other and/or additional purposes without departing from the invention.

Figure 1D:
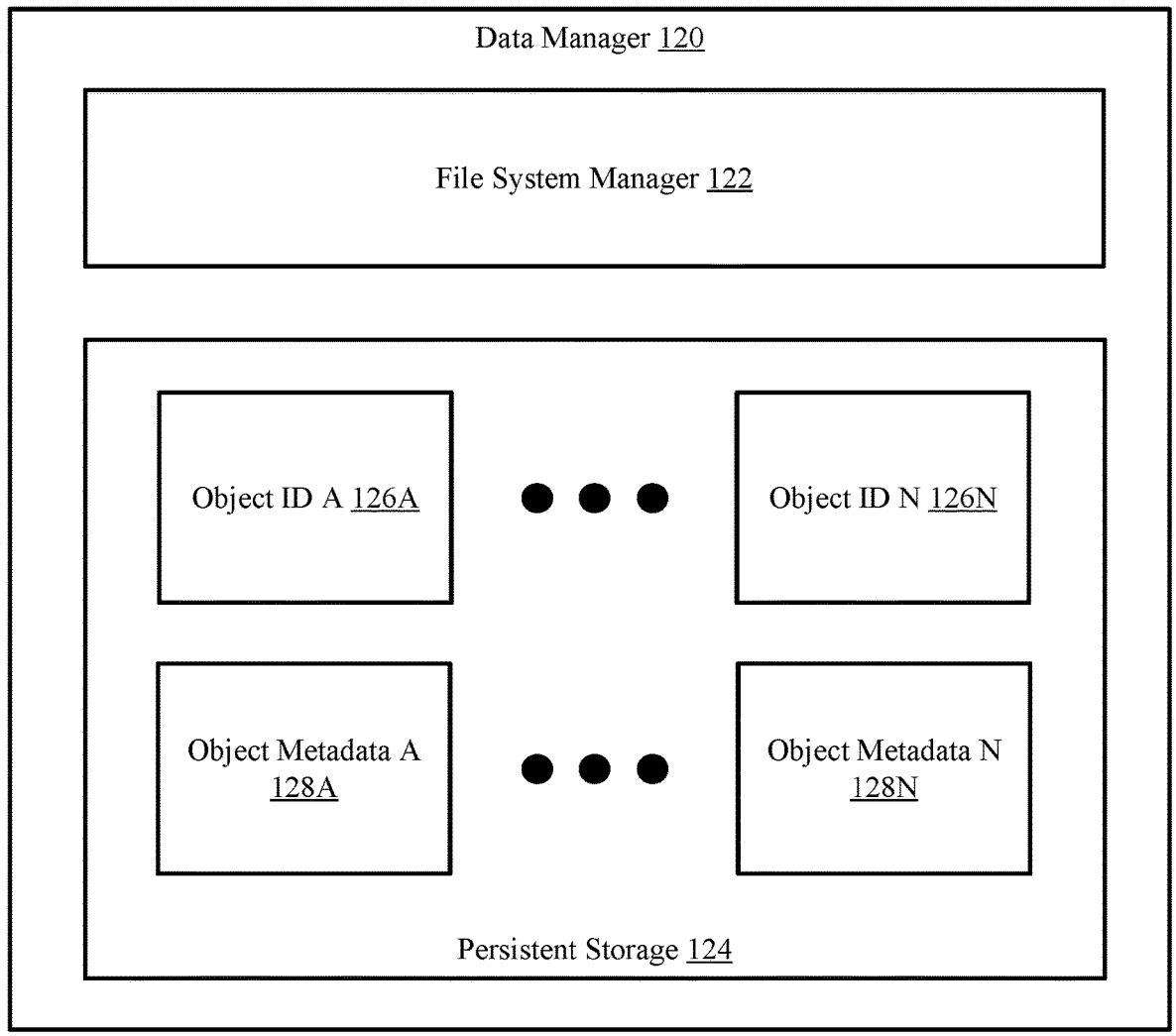
FIG. 1D shows a diagram of a data manager in accordance with one or more embodiments of the invention.

FIG. 1D shows a diagram of a data manager in accordance with one or more embodiments of the invention. The data manager (120) may be an embodiment of the data manager (120, FIG. 1A) discussed above. The data manager (120) may include a file system manager (122) and persistent storage (124). The components of the data manager (120) may be operably connected via any combination of wired and/or wireless connections. Each of the aforementioned components is discussed below. The data manager (120) may include other and/or additional components without departing from the invention.

In one or more embodiments of the invention, the file system manager (122) is a device (physical or logical) that includes the functionality to generate, obtain and/or maintain object metadata (i.e., object identifiers) associated with user data objects generated by users of hosts (100, FIG. 1A). The file system manager (122) may also provide the object metadata to users of hosts (100). Additionally, in one or more embodiments of the invention, the file system manager (122) processes write, read, and update requests for user data generated by users of the hosts (100, FIG. 1A). The file system manager (122) may use the object metadata to determine the data cluster (e.g., 130, FIG. 1A) objects associated with the requests (e.g., read, write, and/or update requests) are stored and initiate the performance of the requests on the data cluster. As a result, the file system manager (122) may transmit or initiate the transmission of user data and requests from hosts (100, FIG. 1A) to data clusters (e.g., 130, FIG. 1A) and from data clusters (e.g., FIG. 1A) to hosts (100, FIG. 1A). The file system manager (122) may include other and/or additional functionality without departing from the invention.

In one or more of embodiments of the invention, the file system manager (122) is implemented as computer instructions, e.g., computer code, stored on a persistent storage that when executed by a processor of a data manager (e.g., 120) cause the data manager (120) to provide the aforementioned functionality of the file system manager (122) described throughout this application and/or all, or a portion thereof, of the methods illustrated in FIGS. 3A-3C.

In one or more embodiments of the invention, the file system manager (122) is implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the file system manager (122) described throughout this application and/or all or a portion of the methods illustrated in FIGS. 3A-3C. The file system manager (122) may be implemented using another type of physical device without departing from the invention.

In one or more embodiments of the invention, the persistent storage (124) stores data. The data may include one or more data structures. The data may include object identifiers (also referred to as object IDs) (e.g., 126A, 126N) and object metadata (e.g., 128A, 128N) associated with the object IDs (e.g., 126A, 126N). The persistent storage (124) may store other and/or additional data without departing from the invention. The persistent storage (124) may be non-volatile storage. In other words, the data stored in the persistent storage (124) is not lost or removed when the persistent storage (124) loses power. The persistent storage (124) may be implemented using physical storage devices and/or logical storage devices.

The persistent storage (124) may be implemented using a physical storage. The physical storage may include any combination of hard disk drives, solid state disk drives, tape drives, and/or any other physical storage mediums for the storage of data. The persistent storage (124) may be another type of physical storage without departing from the invention.

The persistent storage (124) may be implemented using a logical storage (e.g., virtualized storage) that utilizes any quantity of hardware storage resources of any number of computing devices for storing data. For example, the persistent storage (124) may utilize portions of any combination of hard disk drives, solid state disk drives, tape drives, and/or any other physical storage medium of any number of computing devices. The persistent storage (124) may be another type of storage without departing from the invention.

As discussed above, the persistent storage may store one or more object IDs (126A, 126N) and object metadata (e.g., 128A, 128N). The persistent storage (124) may store other and/or additional information without departing from the invention. Each of these data structures is discussed below.

In one or more embodiments of the invention, an object ID (or object identifier) (e.g., 126A, 126N) is one or more data structures that include a unique global identifier that is associated with a user data object (e.g., a file or portion thereof, where the content of the file may be audio content, visual content, text content, or any combination thereof). The unique global identifier may be a unique bit string or character string. The file system manager (122) of the data manager (120) may generate the object IDs (126A, 126N) for user data objects. The object IDs (126A, 126N) may be used by the file system manager and the data processor (132, FIG. 1B) to identify specific user data objects and differentiate specific user data objects from other user data objects. The object IDs (126A, 126N) may also be used by the data processor (132, FIG. 1B) to generate encryption keys. The object IDs (126A, 126N) may include other and/or additional information and may be used for other and/or additional purposes without departing from the invention.

In one or more embodiments of the invention, the object metadata (e.g., 128A, 128N) is one or more data structures that includes information associated with a user data object. The object metadata (128A, 128N) may be used by the file system manager (122) to determine which data cluster (e.g., 130, FIG. 1A) the associated user data object is stored and which users have the authorization to access and/or update the associated user data object. The object metadata may be a copy of, or include all, or a portion, of the object metadata (136) discussed above in FIG. 1B. The object metadata (128A, 128N) may include other and/or additional information and may be used for other and/or additional purposes without departing from the invention. For additional information regarding the object metadata (128A, 128N), refer to FIG. 2B.

Figure 1E:
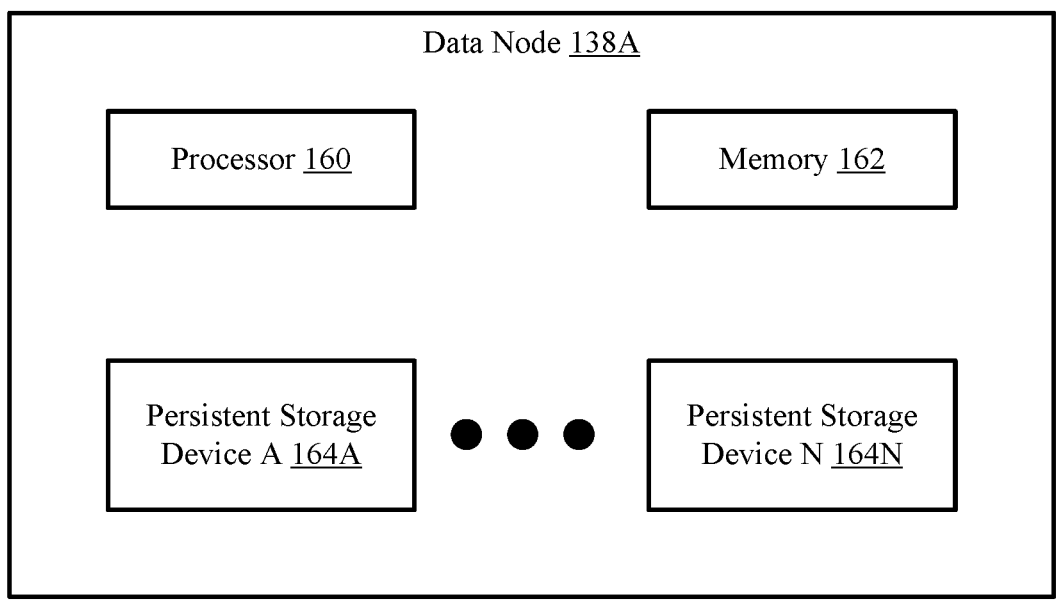
FIG. 1E shows a diagram of a data node in accordance with one or more embodiments of the invention.

FIG. 1E shows a diagram of a data node (138A) in accordance with one or more embodiments of the invention. The data node (138A) may be an embodiment of the data nodes (138A, 138N, FIG. 1B) discussed above. Each data node may include a processor (160), memory (162), and one or more persistent storage devices (164A, 164N). Each component of the data node (130A) may be operatively connected to each other via wired and/or wireless connections. The data node (138A) may have additional, fewer, and/or different components without departing from the invention. Each of the illustrated components of the data node (138A) is discussed below.

In one or more embodiments of the invention, the processor (160) is a component that processes data and processes requests. The processor (160) may be, for example, a central processing unit (CPU). The processor (160) may be other types of processors without departing from the invention. The processor (160) may process a request to store data and/or metadata and rebuild data and/or metadata using data stored in memory (162), the persistent storage devices (164A, 164N), and/or other data nodes (e.g., 130N, FIG. 1B). The processor (160) may process other requests without departing from the invention.

In one or more embodiments of the invention, the data node (138A) includes memory (162), which stores data that is more accessible to the processor (162) than the persistent storage devices (164A, 164N). The memory (162) may be volatile storage. Volatile storage may be storage that stores data that is lost when the storage loses power. The memory may be, for example, Random Access Memory (RAM). In one or more embodiments of the invention, a copy of the data and/or parity chunks required for a persistent storage device rebuilding operation are stored in the memory (162) of the data node (138A).

In one or more embodiments of the invention, the persistent storage devices (164A, 164N) store data and/or rebuild data. The persistent storage devices (164A, 164N) may include a processor (not shown) to process requests data storage and rebuilding requests. The persistent storage devices (164A, 164N) may include non-volatile storage (also referred to as persistent storage). In other words, the data stored in the persistent storage devices (164A, 164N) is not lost or removed when the persistent storage devices (164A, 164N) lose power. The persistent storage (not shown) may be implemented as physical storage and/or logical storage. The data stored in persistent storage devices may be data chunks and/or parity chunks (not shown).

In one or more embodiments of the invention, a data chunk is a data structure that includes a portion of data that was obtained from a host. The data chunks may be (but are not required to be) deduplicated by a data processor and obtained by the persistent storage device (164A) from the data processor. Each of the data chunks may be used by a persistent storage device (e.g., 164A) (or another entity such as another persistent storage device (e.g., 164N) the data node (138A), or the data processor (132, FIG. 1B)) to reconstruct another data chunk or a parity chunk based on an erasure coding algorithm that was applied to the other data chunk or parity chunk.

In one or more embodiments of the invention, a parity chunk (not shown) is a data structure that includes a parity value generated using an erasure coding algorithm. The parity value may be generated by applying the erasure coding algorithm to one or more data chunks stored in the persistent storage device (164A) or other data nodes. Each of the parity chunks may be used by the persistent storage device (164A) (or another entity such as another persistent storage device (e.g., 164N) the data node (138A), or the data processor (132, FIG. 1B)) to reconstruct another parity chunk or a data chunk based on an erasure coding algorithm that was applied to the other parity chunk or data chunk.

Figure 2A:
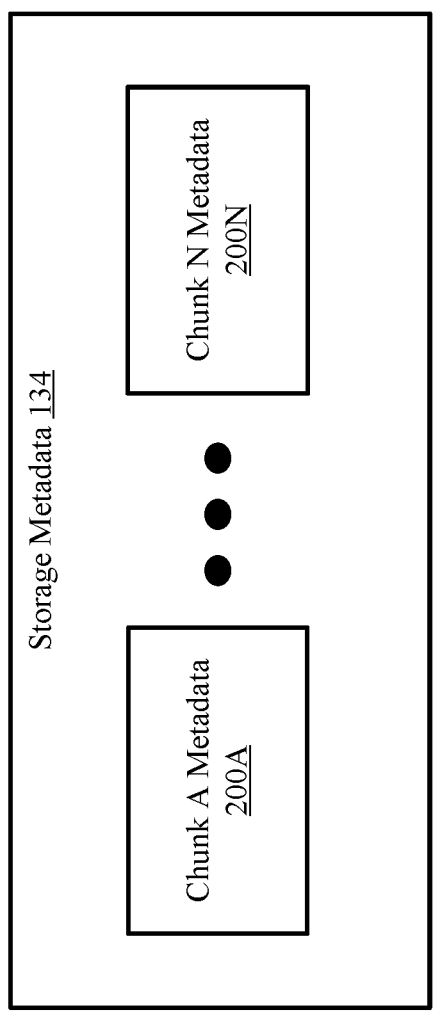
FIG. 2A shows a diagram of storage metadata in accordance with one or more embodiments of the invention.

FIG. 2A shows a diagram of storage metadata in accordance with one or more embodiments of the invention. The storage metadata (134) may be an embodiment of the storage metadata (134, FIG. 1B) discussed above. As discussed above, the storage metadata (200) includes information about data chunks and/or parity chunks (collectively, chunks) stored in a data cluster (e.g., 130, FIG. 1A). The storage information may include chunk metadata (200A, 200N). The storage metadata (134) may include other and/or additional information without departing from the invention.

In one or more embodiments of the invention, chunk metadata (200A, 200N) includes metadata associated with each data and/or parity chunk stored in the data cluster (e.g., 130, FIG. 1A). Each chunk metadata (chunk A metadata (200A), chunk N metadata (200N)) may include chunk identifiers and storage locations associated with each chunk stored in the data cluster (e.g., 130, FIG. 1A). The chunk identifiers may include a unique bit string or character string that differentiates a specific chunk for the other chunks stored in the data cluster (e.g., 130, FIG. 1A). Each chunk identifier may be associated with a storage location. The storage location may include a data node identifier that may be a unique bit string or character string that may be used to differentiate a specific data node (e.g., 138A) from the other data nodes (e.g., 138N) included in the data cluster (e.g., 130, FIG. 1A). The storage location may be used to determine where a chunk is stored in the data cluster (e.g., 130, FIG. 1A). The storage metadata (134) may be generated by the data processor (132, FIG. 1B) when initiating the storage of the chunks in data nodes (e.g., 138A, 138N). The chunk metadata (200A, 200N) may include other and/or additional information without departing from the invention.

Figure 2B:
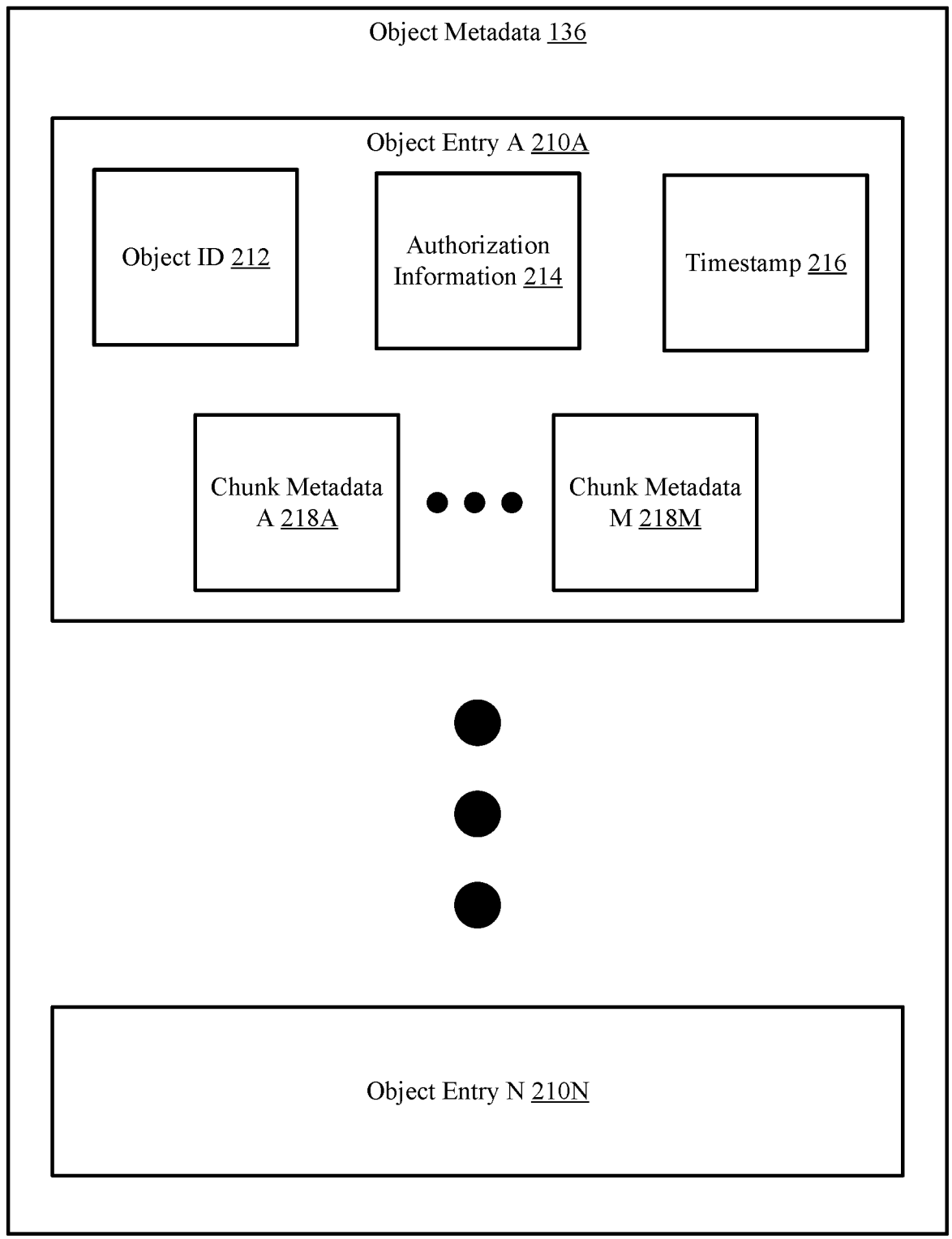
FIG. 2B shows a diagram of object metadata in accordance with one or more embodiments of the invention.

FIG. 2B shows a diagram of object metadata in accordance with one or more embodiments of the invention. The object metadata (136) may be an embodiment of the storage metadata (136, FIG. 1B) discussed above. As discussed above, the object metadata (136) includes information about user data objects stored in a data cluster (e.g., 130, FIG. 1A). The object metadata (136) may include one or more object entries (e.g., object entry A 210A, object entry N 210N). Each object entry (e.g., 210A) may be associated with a user data object stored in the data cluster (e.g., FIG. 1A). The object metadata (136) may be generated and/or updated by data processor (132, FIG. 1B) when storing user data in the data cluster (130, FIG. 1A). The object metadata (134) may include other and/or additional information without departing from the invention.

As discussed above, the object metadata (134) may include one or more object entries (e.g., 210A, 210N). Each object entry (e.g., 210A, 210N) may include an object ID (212), authorization information (214), a timestamp (216), and chunk metadata (e.g., 218A, 218M). Each of these data structures is discussed below.

In one or more embodiments of the invention, an object ID (or object identifier) (e.g., 126A, 126N) is one or more data structures that include a unique global identifier that is associated with a user data object. The unique global identifier may be a unique bit string or character string. The data manager (120) may assign object IDs (126A, 126N) to user objects during a write operation. The object IDs (126A, 126N) may be obtained by the data processor (132, FIG. 1B) from the data manager (120, FIG. 1A) and stored in persistent storage (not shown) of the data processor. The object IDs (126A, 126N) may be used by the file system manager and the data processor (132, FIG. 1B) to identify and/or differentiate specific user data objects from other user data objects stored in the data cluster (130, FIG. 1A). The object IDs (126A, 126N) may also be used by the data processor (132, FIG. 1B) to generate encryption keys as discussed above. The object IDs (126A, 126N) may include other and/or additional information and may be used for other and/or additional purposes without departing from the invention.

In one or more embodiments of the invention, authorization information (214) is one or more data structures that specify users who have access to the user data object for which the authorization information (214) is associated. The authorization information (214) may also specify the type of access each authorized user includes. The authorization information (214) may be used by the data processor (132, FIG. 1B) to determine whether a user has the authorization required to access the user data object associated with the authorization information (214) and what type of authorization the user may be associated. The authorization information (214) may include a list of user identifiers associated with users that have the authorization to access the user data object. The authorization information (214) may also include authorization type identifiers associated with the user identifiers that may specify the type of access a user may include. The authorization type identifiers may be a unique bit string or character string the is associated with a type of access. Types of access may include read and write access, read-only access, and/or other and or additional types of access without departing from the invention. The authorization information (214) may include other and/or additional information and may be used for other and/or additional purposes without departing from the invention.

In one or more embodiments of the invention, the timestamp (216) specifies a point in time that corresponds to a state of the object as specified by a set of chunk metadata. The timestamp (216) may be used to replay the object to a point in time. In one or more embodiments of the invention, the object is replayed to a point in time when the data associated with the object that was part of the object at the point in time is reconstructed to generate the object at the point in time. Said another way, the content of each object may vary over time and each time the object is modified a corresponding object entry is created where the object entry specifies chunk metadata for the chunks that make up the object at that point in time.

For example, at a first point in time, the object may include a first set of data, of which there is a first chunk and a second chunk. At a second point in time, the object may include a second set of data, of which there is a first chunk and a third chunk. The third chunk may be a modified version of the second chunk. The object may be replayed to the first point in time by obtaining the first chunk and the second chunk. The object may be replayed to the second point in time by obtaining the first chunk and the third chunk. For each point in time, there may be an object entry that specifies the object, the point in time, and each chunk used to replay the object.

In one or more embodiments of the invention, chunk metadata (218A, 218M) includes metadata associated with each data and/or parity chunk stored in the data cluster (e.g., 130, FIG. 1A). Each chunk metadata (chunk A metadata (218A), chunk M metadata (218M)) may include chunk identifiers associated with each chunk stored in the data cluster (e.g., 130, FIG. 1A). The chunk identifiers may include a unique bit string or character string that differentiates a specific chunk for the other chunks stored in the data cluster (e.g., 130, FIG. 1A). The chunk metadata (218A, 218M) may include deduplication information and/or erasure coding information. The chunk metadata (218A, 218M) may be generated by the data processor (132, FIG. 1B) when initiating the storage of the chunks in data nodes (e.g., 138A, 138N). The chunk metadata (218A, 218M) may include other and/or additional information without departing from the invention.

FIG. 3A shows a flowchart for storing data in accordance with one or more embodiments of the invention. The method shown in FIG. 3A may be performed by, for example, a data processor (132, FIG. 1B). Other components of the system illustrated in FIG. 1B may perform the method of FIG. 3A without departing from the invention. While various steps in the flowchart are presented and described sequentially, one of ordinary skill in the relevant art will appreciate that some or all of the steps may be executed in different orders, may be combined or omitted, and some or all steps may be executed in parallel.

In step 300, a write request for data is obtained. A user of a host may send a message to a data manager requesting to write data to a data cluster. In response to obtaining the write request, the data manager may assign, and include with the write request, an object identifier associated with the data, and send the write request to the data cluster. The write request may include a data object, e.g., a file segment, a collection of files, or any other type of data without departing from the invention. The write request may include a user identifier and an object identifier associated with the included object. A write request for data may be obtained via other and/or additional methods without departing from the invention.

In step 302, an intermediate key request is sent to a key manager. In response to obtaining the write request, the data processor of the data cluster may send a message to the key manager that includes a request for an intermediate key. The request may include the data cluster identifier associated with the data cluster and a user identifier associated with the data. An intermediate key request may be sent to the key manager via other and/or additional methods without departing from the invention.

In step 304, an intermediate key is obtained from the key manager. After obtaining the intermediate key request from the data processor, the key manager may use the user identifier and the data cluster identifier included in the request to identify a data cluster key and a user key associated with the data cluster identifier and user identifier. The key manager then may use the identified user key, data cluster key, and encryption key generation algorithm to generate an intermediate key associated with the user key and the data cluster key. The intermediate key may be generated to prevent sharing user keys and data cluster keys and may mitigate data security risk. After generating the intermediate key, the key manager may send the intermediate key to the data cluster. The intermediate key may be obtained from the key manager via other and/or additional methods without departing from the invention.

In step 306, deduplication and/or erasure coding is performed on the data to generate chunks. In one or more embodiments of the invention, performing erasure coding includes dividing the obtained data into portions, referred to as data chunks. Each data chunk may include any number of data segments associated with the obtained data. The individual data chunks may then be combined (or otherwise grouped) into slices (also referred to as Redundant Array of Independent Disks (RAID) slices). One or more parity values are then calculated for each of the aforementioned slices using the data chunks included in the slices. The number of parity values may vary based on the erasure coding algorithm that is being used as part of the erasure coding procedure. Non-limiting examples of erasure coding algorithms are RAID-3, RAID-4, RAID-5, and RAID-6. Other erasing coding algorithms may be used without departing from the invention.

In one or more embodiments of the invention, the number of data chunks and parity chunks generated is determined by the erasure coding procedure, which may be specified by the host, by the data cluster, and/or by another entity.

In one or more embodiments of the invention, the performing deduplication includes identifying the data and/or parity chunks of the obtained data and assigning a fingerprint to each data chunk. A fingerprint is a unique identifier (i.e., chunk identifier) that may be stored in metadata of the chunk. The data processor performing the deduplication may generate a fingerprint for a chunk and identify whether the fingerprint matches an existing fingerprint stored in storage metadata. If the fingerprint matches an existing fingerprint, the chunk may be deleted, as it is already stored in the data cluster. If the fingerprint does not match any existing fingerprints, the chunk may be stored as a deduplicated chunk. Additionally, the fingerprint of each deduplicated data chunk is stored in a storage metadata slice entry of the storage metadata.

In one or more embodiments of the invention, the deduplicated data chunks collectively make up the deduplicated data. In one or more embodiments of the invention, the deduplicated data chunks are the data chunks that were not deleted during deduplication.

Deduplication and/or erasure coding may be performed on the data to generate chunks via other and/or additional methods without departing from the invention.

In step 308, storage metadata and object metadata is generated for the chunks. In one or more embodiments of the invention, the object metadata is generated by including an object entry that specifies (i) the object ID, (ii) the deduplicated the parity chunks and/or data chunks, (iii) timestamp of the write operation, and (iv) authorization information associated with the data. In one or more embodiments of the invention, the storage metadata is generated by including the chunk metadata associated with the object. The chunk metadata may specify the storage locations of the all the chunks associated with the data. The storage metadata and the object metadata may be generated for the chunks via other and/or additional methods without departing from the invention.

In step 310, an encryption key is generated based on the intermediate key and the object identifier associated with the data. The data processor may generate the encryption key using the intermediate key obtained from the key manager, the object identifier associated with the data, and an encryption key generation algorithm. The encryption key generation algorithm may be any encryption key generation algorithm that generates encryption keys using intermediate keys and object identifiers without departing from the invention. The encryption key may be generated based on the intermediate key and the object identifier associated with the data via other and/or additional methods without departing from the invention.

In step 312, the chunks are stored in data nodes of the data cluster. The data processor may send the chunks to the data nodes specified in the storage metadata. The data processor may also send a message to the data nodes that includes a request to store the chunks in persistent storage devices of the data nodes. The chunks may be stored in the data nodes of the data cluster via other and/or additional methods without departing from the invention.

In step 314, the storage metadata and/or the object metadata associated with the object is encrypted using the encryption key. The data processor may use the encryption key to encrypt the storage metadata and/or the object metadata associated with the object. As a result, a portion of the storage metadata and/or the object metadata may be encrypted. In other words, the encrypted portion of the storage metadata and/or object metadata may not be recognizable to the data processor or other entities without decrypting the encrypted portions using the encryption key. The data processor may not encrypt the object ID included in the storage metadata and the object metadata in order to identify and access the encrypted storage metadata and/or object metadata to decrypt the encrypted portions at some point in time in the future. The storage metadata and/or the object metadata associated with the object may be encrypted using the encryption key via other and/or additional methods without departing from the invention.

In step 316, the intermediate key and the encryption key used to encrypt the storage metadata and/or the object metadata associated with the object are deleted. The data processor may delete the intermediate key used to generate the encryption key and the encryption key used to encrypt the storage metadata and/or object metadata associated with the object to increase the security of the user data object. After deletion, the data processor may not have direct access to the encryption key used to encrypt the storage metadata and/or object metadata. To access the object, the encryption key must be generated a second time by the data processor instead of simply accessing the key from some storage component of the data cluster therefore greatly increasing the security of the data. The encryption key used to encrypt the storage metadata and/or the object metadata associated with the object may be deleted via other and/or additional methods without departing from the invention.

The method may end following step 316.

FIG. 3B shows a flowchart for providing data in accordance with one or more embodiments of the invention. The method shown in FIG. 3B may be performed by, for example, a data processor (132, FIG. 1B). Other components of the system illustrated in FIG. 1B may perform the method of FIG. 3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 320, a read request for data is obtained. A user of a host may send a message to a data manager requesting to read data to a data cluster. In response to obtaining the read request, the data manager may identifier, and include with the read request, an object identifier associated with the targeted data stored in the data cluster, and send the read request to the data cluster. The read request also may include a user identifier and an object identifier associated with the targeted object. A read request for data may be obtained via other and/or additional methods without departing from the invention.

In step 322, an intermediate key request is sent to a key manager. In response to obtaining the read request, the data processor of the data cluster may send a message to the key manager that includes a request for an intermediate key. The request may include the data cluster identifier associated with the data cluster and a user identifier associated with the data. An intermediate key request may be sent to the key manager via other and/or additional methods without departing from the invention.

In step 324, an intermediate key is obtained from the key manager. After obtaining the intermediate key request from the data processor, the key manager may use the user identifier and the data cluster identifier included in the request to identify a data cluster key and a user key associated with the data cluster identifier and user identifier. The key manager then may use the identified user key, data cluster key, and encryption key generation algorithm to generate an intermediate key associated with the user key and the data cluster key. The intermediate key may be generated to prevent sharing user keys and data cluster keys and may mitigate data security risk. After generating the intermediate key, the key manager may send the intermediate key to the data cluster. The intermediate key may be obtained from the key manager via other and/or additional methods without departing from the invention.

In step 326, an encryption key is generated based on the intermediate key and an object identifier associated with the data. The data processor may generate the encryption key using the intermediate key obtained from the key manager, the object identifier associated with the data, and an encryption key generation algorithm. The encryption key generation algorithm may be any encryption key generation algorithm that generates encryption keys using intermediate keys and object identifiers without departing from the invention. The encryption key may be generated based on the intermediate key and the object identifier associated with the data via other and/or additional methods without departing from the invention.

In step 328, decrypt storage metadata and/or object metadata associated with the data using the encryption key. The data processor may identify encrypted storage metadata and/or object metadata that is associated with the targeted data object using the object ID associated with the data object. After identifying the encrypted storage metadata and/or object metadata, the data process may use the encryption key to decrypt the encrypted storage metadata and/or object metadata decrypted copy of the storage metadata and/or object metadata. The decrypted copy of storage metadata and/or object metadata may be stored in volatile memory of the data processor. The encrypted storage metadata and/or object metadata may remain stored in persistent storage of the data processor. The storage metadata and/or the object metadata may be decrypted using the encryption key via other and/or additional methods without departing from the invention.

In step 330, obtain copies of chunks from data nodes using the storage metadata and the object metadata. The data processor may use the chunk metadata of the storage metadata and/or object metadata to identify the storage locations of each of the chunks associated with the data object. The storage locations may specify the data nodes in which the chunks are stored. The data processor may send a message to the data nodes in which the chunks are stored. The message may include a request to copy the chunks and send the chunk copies to the data processor. After obtaining the chunk copies requests, the data nodes may copy the specified chunks and send the chunk copies to the data processor. The chunk copies may be obtained from the data nodes using the storage metadata and the object metadata via other and/or additional methods without departing from the invention.

In step 332, rebuild data using the copies of chunks and object metadata. The data processor may use the object metadata to rebuild the data using the chunks. The object metadata may include chunk metadata. If the chunks were deduplicated, the chunk metadata may include deduplication information associated with each chunk. The data processor may use the deduplication information to perform undeduplication on the chunk copies to generate undeduplicated data chunk copies. Additionally, if erasure coding was performed on the chunk copies, the chunk metadata may include erasure coding information associated with each chunk copy. The data processor may use the erasure coding information to rebuild the data using the chunk copies. The data may be rebuilt using copies of the chunks and the object metadata via other and/or additional methods without departing from the invention.

In step 334, provide data to the data manager. The data processor may send a message to the data manager. The message may include the object ID and the data that was rebuilt. The data manager may then provide the data to a user of a host. The data may be provided to the data manager via other and/or additional methods without departing from the invention.

In step 336, the intermediate key and the encryption key used to decrypt the storage metadata and/or the object metadata associated with the data is deleted. The data processor may delete the intermediate key used to generate the encryption key and the encryption key used to decrypt the storage metadata and/or object metadata associated with the object to increase the security of the object. After deletion, the data processor may not have direct access to the encryption key used to encrypt the storage metadata and/or object metadata. To access the object, the encryption key must be regenerated by the data processor using an intermediate key from a key manager and an object ID instead of simply accessing the key from some storage component of the data cluster therefore greatly increasing the security of the data.

In one or more embodiments of the invention, deleting the encryption key used to decrypt the storage metadata and/or the object metadata associated with the object also includes deleting the decrypted storage metadata and/or the decrypted object metadata from volatile memory of the data processor. After deletion, the data processor may not have direct access to the decrypted storage metadata and/or object metadata. To access the decrypted storage metadata and/or object metadata, the encryption key must be regenerated by the data processor and the storage metadata and/or object metadata must be decrypted again using the encryption key instead of simply accessing the decrypted storage metadata and/or object metadata from the volatile memory of the data processor therefore greatly increasing the security of the data. The encryption key used to decrypt the storage metadata and/or the object metadata associated with the object may be deleted via other and/or additional methods without departing from the invention.

The method may end following step 336.

FIG. 3C shows a flowchart for updating authentication information in accordance with one or more embodiments of the invention. The method shown in FIG. 3C may be performed by, for example, a data processor (132, FIG. 1B). Other components of the system illustrated in FIG. 1B may perform the method of FIG. 3C without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 340, an authorization update request for data is obtained. A user of a host may send a message to a data manager requesting to authorization information of data stored in a data cluster. In response to obtaining the authorization update request, the data manager may identify, and include with the authorization update request, an object identifier associated with the targeted data stored in the data cluster, and send the authorization update request to the data cluster. The authorization update request also may include two or more user identifiers and an object identifier associated with the targeted object. The user identifiers may include a first user identifier that has the authorization to access the data and the user identifier(s) to be included in the updated authorization information of the data. An authorization update request for data may be obtained via other and/or additional methods without departing from the invention.

In step 342, a request for a first intermediate key is sent to a key manager. In response to obtaining the authorization update request, the data processor of the data cluster may send a message to the key manager that includes a request for a first intermediate key. The request may include the data cluster identifier associated with the data cluster and the first user identifier associated with the data. A first intermediate key request may be sent to the key manager via other and/or additional methods without departing from the invention.

In step 344, a first intermediate key is obtained from the key manager. After obtaining the first intermediate key request from the data processor, the key manager may use the first user identifier and the data cluster identifier included in the request to identify a data cluster key and a first user key associated with the data cluster identifier and first user identifier. The key manager then may use the identified first user key, data cluster key, and encryption key generation algorithm to generate the first intermediate key associated with the first user key and the data cluster key. The first intermediate key may be generated to prevent sharing user keys and data cluster keys and may mitigate data security risk. After generating the first intermediate key, the key manager may send the first intermediate key to the data cluster. The first intermediate key may be obtained from the key manager via other and/or additional methods without departing from the invention.

In step 346, a first encryption key is generated using the first intermediate key and the object identifier associated with the data. The data processor may generate the first encryption key using the first intermediate key obtained from the key manager, the object identifier associated with the data, and an encryption key generation algorithm. The encryption key generation algorithm may be any encryption key generation algorithm that generates encryption keys using intermediate keys and object identifiers without departing from the invention. The first encryption key may be generated based on the first intermediate key and the object identifier associated with the data via other and/or additional methods without departing from the invention.

In step 348, storage metadata and/or object metadata associated with the data is decrypted using the first encryption key. The data processor may identify encrypted storage metadata and/or object metadata that is associated with the targeted data object using the object ID associated with the data object. After identifying the encrypted storage metadata and/or object metadata, the data process may use the first encryption key to decrypt the encrypted storage metadata and/or object metadata decrypted copy of the storage metadata and/or object metadata. The decrypted copy of storage metadata and/or object metadata may be stored in volatile memory of the data processor. The encrypted storage metadata and/or object metadata may remain stored in persistent storage of the data processor. The storage metadata and/or the object metadata may be decrypted using the encryption key via other and/or additional methods without departing from the invention.

In step 350, a request for a second intermediate key is sent to the key manager. After decryption the storage metadata and/or object metadata with the first encryption key, the data processor of the data cluster may send a message to the key manager that includes a request for a second intermediate key. The request may include the data cluster identifier associated with the data cluster, the first user identifier associated with the data, and the other user identifier(s) to be included in the authorization information. A second intermediate key request may be sent to the key manager via other and/or additional methods without departing from the invention.

In step 352, the second intermediate key is obtained from the key manager. After obtaining the second intermediate key request from the data processor, the key manager may use the user identifiers and the data cluster identifier included in the request to identify a data cluster key and user keys associated with the data cluster identifier and user identifiers. The key manager then may use the identified user keys, data cluster key, and encryption key generation algorithm to generate the second intermediate key associated with the user keys and the data cluster key. The second intermediate key may be generated to prevent sharing user keys and data cluster keys and may mitigate data security risk. After generating the second intermediate key, the key manager may send the second intermediate key to the data cluster. The second intermediate key may be obtained from the key manager via other and/or additional methods without departing from the invention.

In step 354, a second encryption key is generated using the second intermediate key and the object identifier associated with the data. The data processor may generate the second encryption key using the second intermediate key obtained from the key manager, the object identifier associated with the data, and an encryption key generation algorithm. The encryption key generation algorithm may be any encryption key generation algorithm that generates encryption keys using intermediate keys and object identifiers without departing from the invention. The second encryption key may be generated based on the second intermediate key and the object identifier associated with the data via other and/or additional methods without departing from the invention.

In step 356, the storage metadata and/or object metadata associated with the data is encrypted using the second encryption key. Prior to encrypting the decrypted storage metadata and/or object metadata with the second encryption key, the data processor may update the authorization information included in the object metadata. The data processor may include in the authorization information of the object metadata all the user identifiers included in the authorization update request. Additionally, the data processor may include the authorization type associated with each user identifier included in the authorization metadata. As a result, all users included in the authorization information may access the data object. The authorization information may be updated via other and/or additional methods without departing from the invention.

The data processor may use the second encryption key to encrypt the decrypted storage metadata and/or the object metadata associated with the object. As a result, a portion of the storage metadata and/or the object metadata may be encrypted with the second encryption key. In other words, the encrypted portion of the storage metadata and/or object metadata may not be recognizable to the data processor or other entities without decrypting the encrypted portions using the second encryption key. The data processor may not encrypt the object ID included in the storage metadata and the object metadata in order to identify and access the encrypted storage metadata and/or object metadata to decrypt the encrypted portions at some point in time in the future. The data processor may store the storage metadata and/or object metadata encrypted with the second encryption key in persistent storage. The data processor may overwrite or delete the storage metadata and/or the object metadata associated with the data that was encrypted with the first encryption key. The storage metadata and/or the object metadata associated with the object may be encrypted using the second encryption key via other and/or additional methods without departing from the invention.

In step 358, the first and second intermediate keys and the first and second encryption keys are deleted. The data processor may delete the first and second intermediate keys used to generate the first and second encryption keys and the encryption keys used to decrypt and encrypt the storage metadata and/or object metadata associated with the object to increase the security of the object. After deletion, the data processor may not have direct access to the first and second encryption keys used to encrypt and decrypt the storage metadata and/or object metadata. To access the object, the second encryption key must be regenerated by the data processor using an intermediate key from a key manager and an object ID instead of simply accessing the second encryption key from some storage component of the data cluster therefore greatly increasing the security of the data.

The method may end following step 358.

EXAMPLE

Figure 4A:
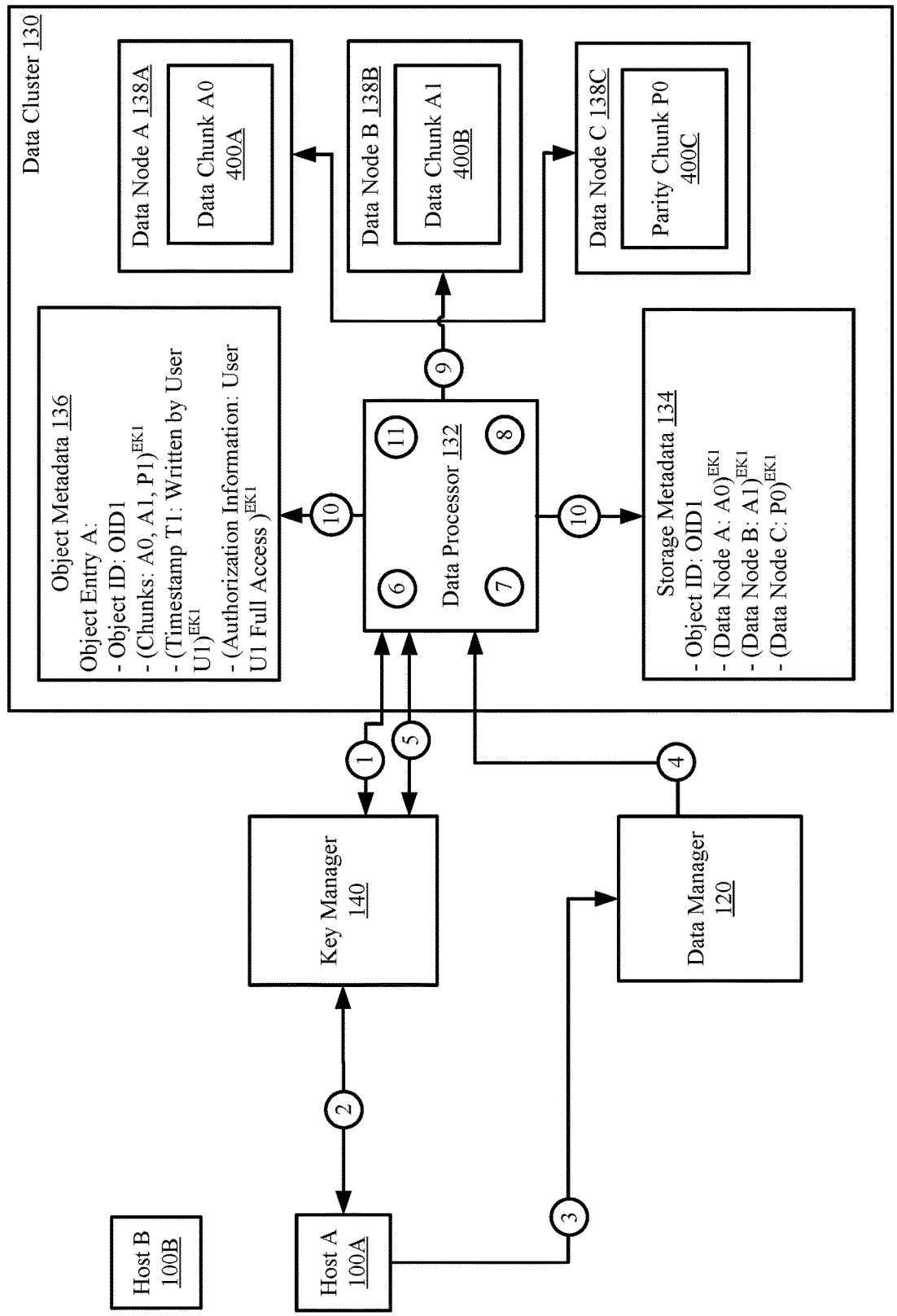
FIG. 4A shows a first example in accordance with one or more embodiments of the invention.
Figure 4B:
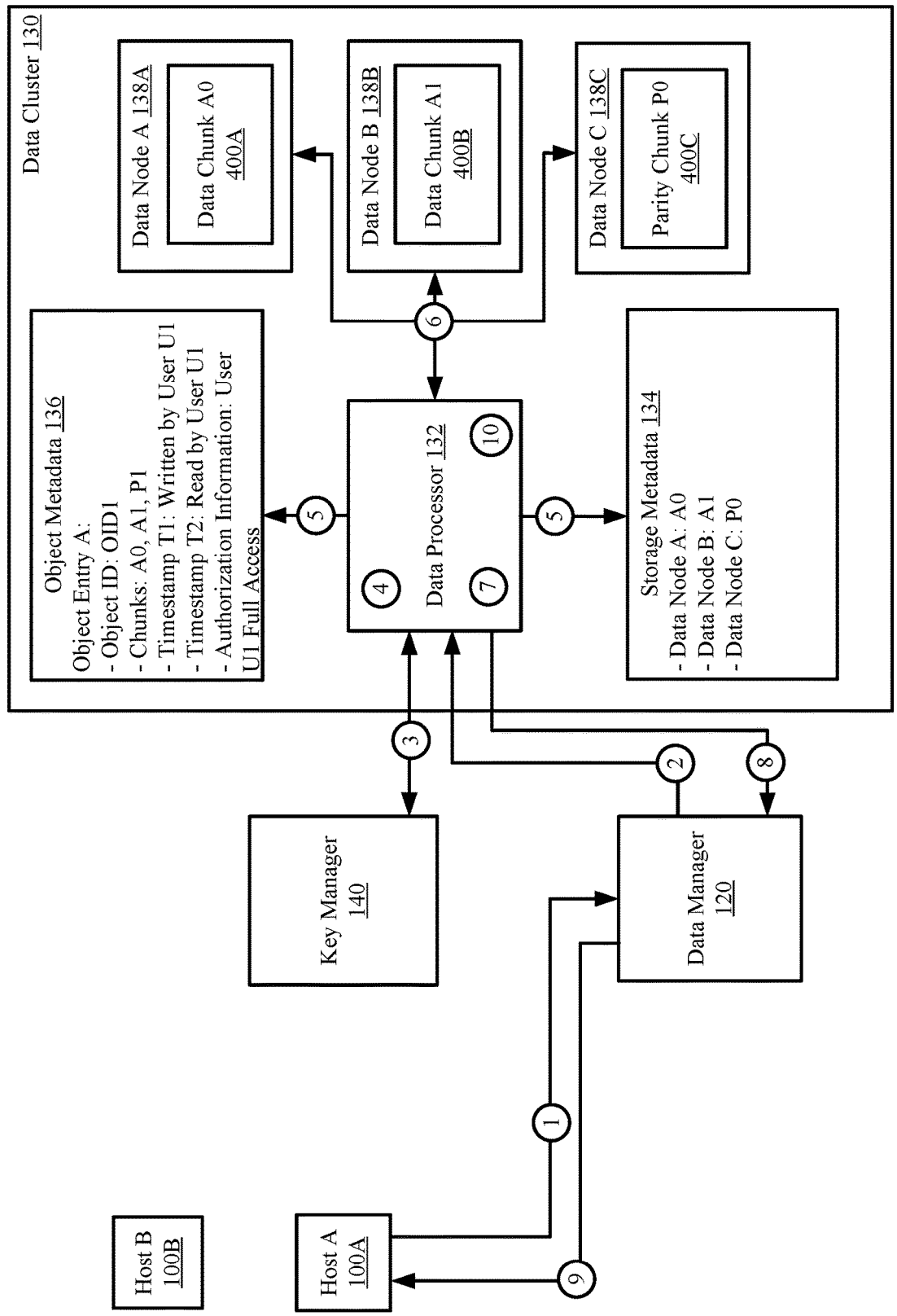
FIG. 4B shows a second example in accordance with one or more embodiments of the invention.
Figure 4C:
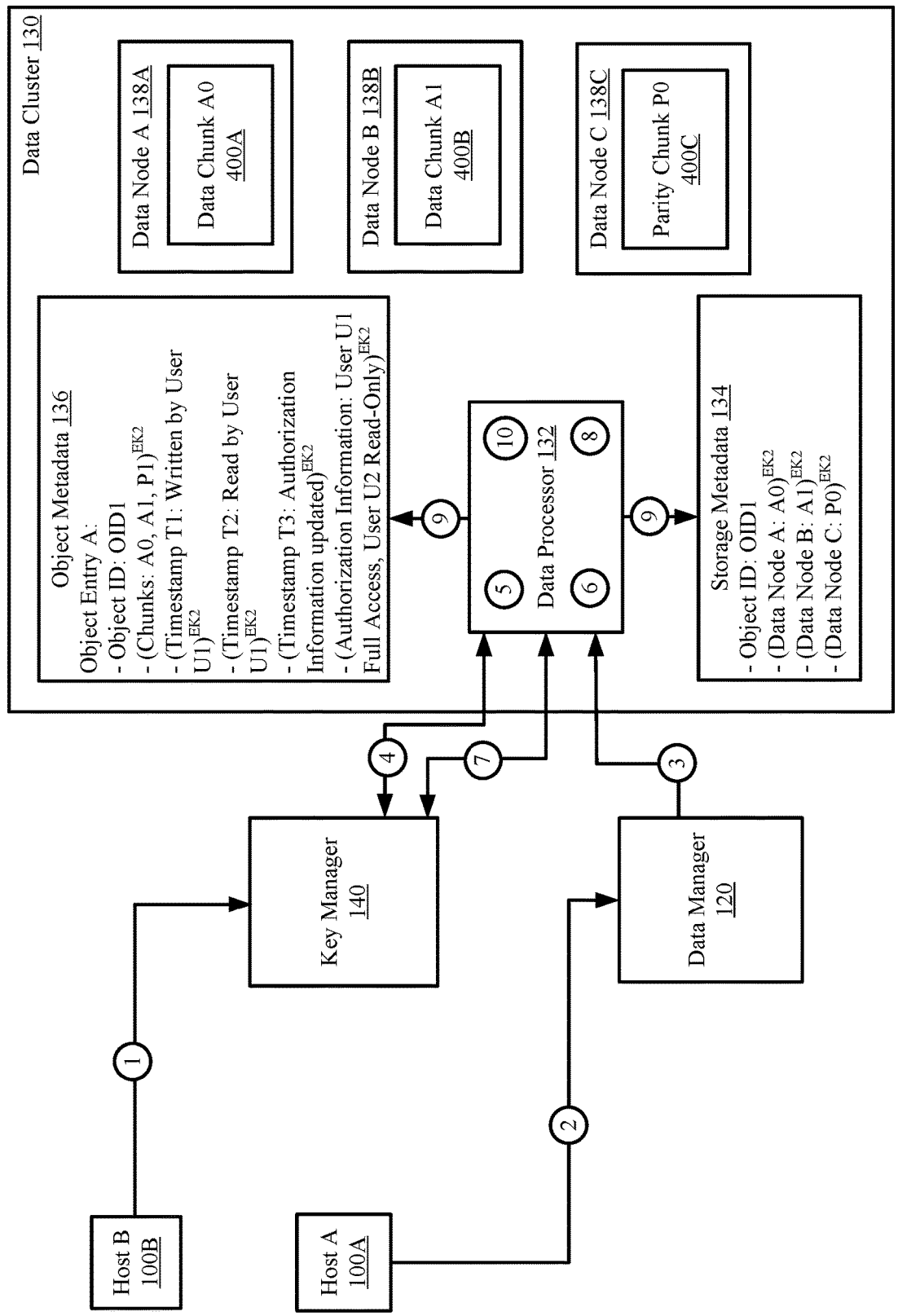
FIG. 4C shows a third example in accordance with one or more embodiments of the invention.

The following section describes three examples. The examples are not intended to limit the invention. The examples are illustrated in FIGS. 4A-4C. Turning to the first example, consider a scenario in which a data cluster obtains a write request from a data manager to store a user data object generated by a user of a host. The host requests that the object be stored in the data cluster using a 2:1 erasure coding procedure. FIG. 4A shows a diagram of a first example in accordance with one or more embodiments of the invention. At some point prior to receiving the write request, the key manager (140) sends a request to the data processor (132) of the data cluster (130) for a data cluster identifier. In response to obtaining the request, the data processor (132) sends the data cluster identifier associated with the data cluster (130) to the key manager (140) [1]. After obtaining the data cluster identifier, the key manager (140) generates a data cluster key and associates the data cluster key with the data cluster identifier.

In addition, prior to receiving the write request, the key manager (140) also sends a request to host A (100A) for a user identifier. In response to obtaining the request, host A (100A) sends the user identifier associated with a user of host A (100A) to the key manager (140) [2]. After obtaining the user identifier, the key manager (140) generates a user key and associates the user key with the user identifier.

After [1] and [2] have been completed, host A (100A) sends a write request to the data manager (120) [3]. The write request includes the user data object and the user identifier associated with the user data object. The data manager (120) obtains the write request, generates object metadata associated with the user data object, and generates and assigns an object ID associated with the user data object. The data manager (120) then sends a request to the data processor (132) [4]. The request includes the user identifier, the object ID, and the user data object.

In response to obtaining the write request, the data processor (132) sends an intermediate key request to the key manager (140). The intermediate key request includes the user identifier and the data cluster identifier. After obtaining the intermediate key request, the key manager (140) generates an intermediate key using the user key and the data cluster key associated with the user identifier and the data cluster identifier included in the intermediate key request. Once the intermediate key is generated, the key manager (140) sends the intermediate key to the data processor (132) [5].

After obtaining the intermediate key from the key manager (140), the data processor (132) then performs erasure coding on the obtained data object [6]. The data processor (132) generates two data chunks, data chunk A0 (400A) and data chunk A1 (400B). The data processor (132) also generates parity chunk P0 (400C) using the aforementioned data chunks. After performing erasure coding on the user data object and generating the data chunks and parity chunks (400A, 400B, 400C), the data processor (132) generates storage metadata (134) and object metadata (136) associated with the user data object [7]. The storage metadata (134) includes an object identifier and storage locations of the chunks (400A, 400B, 400C) associated with the object identifier as depicted in FIG. 4A. The object metadata (136) includes object entry A that is associated with the user data object. Object entry A includes the object identifier, chunk identifiers, timestamps, and authorization information as depicted in FIG. 4A.

After generating the storage metadata (134) and the object metadata (136), the data processor (132) generates an encryption key using the object ID associated with the user data object and the intermediate key obtained from the key manager (140) [8]. Once the encryption key is generated, the data processor (132) sends the chunks (400A, 400B, 400C) to the data nodes of the data cluster (130) where the chunks are stored [9]. Data chunk A0 (400A) is stored in data node A (138A), data chunk A1 (400B) is stored in data node B (138B), and parity chunk P0 (400C) is stored in data node C (138C).

After the chunks (400A, 400B, 400C) are stored in the data nodes (138A, 138B, 138C), the data processor (132) encrypts the storage metadata (134) and object metadata (136) with the encryption key [10]. All of the encrypted information included in the storage metadata (134) and object metadata (136) is depicted within parenthesis with EK1 (i.e., the first encryption key) as a superscript (e.g., (Data Node A: A0)$^{EK1}$). Once the storage metadata (134) and the object metadata are encrypted, the data processor (132) deletes the encryption key and the intermediate key [11].

Turning to the second example, consider a scenario in which a data cluster obtains a read request from a data manager to provide a user data object stored in the data cluster to a user of a host. FIG. 4B shows a diagram of a second example in accordance with one or more embodiments of the invention. Host A (100A) sends a read request to the data manager (120) for a user data object stored in the data cluster (130) [1]. In response to obtaining the request, the data manager (120) identifies a user identifier and an object ID associated with the read request and sends the read request along with the user identifier and the object ID to the data processor (132) of the data cluster (130) [2].

The data processor (132) then sends an intermediate key request to the key manager (140). The intermediate key request includes the user identifier and the data cluster identifier. In response to receiving the intermediate key request, the key manager (140) generates an intermediate key using a user key and a data cluster key associated with the user identifier and the data cluster identifier included in the intermediate key request. After generating the intermediate key, the key manager (140) sends the intermediate key to the data processor (132) [3].

The data processor (132) then generates an encryption key using the intermediate key obtained from the key manager (140) and the object ID associated with the read request [4]. After generating the encryption key, the data processor (132) identifies the storage metadata and object metadata associated with the read request using the object ID. The data processor (132) then decrypts the storage metadata and object metadata using the encryption key [5]. The data processor (132) then uses the storage metadata and object metadata to identify the data nodes (138A, 138B, 138C) that include the chunks (400A, 400B, 400C) associated with the object specified in the read request. The data processor then sends a request to the data nodes (138A, 138B, 138C) to send copies of the chunks (400A, 400B, 400C) to the data processor (132). After obtaining the request, the data nodes (138A, 138B, 138C) copy the chunks (400A, 400B, 400C) and send the chunk copies to the data processor (132) [6].

After obtaining copies of the chunks (400A, 400B, 400C), the data processor (132) rebuilds the data object using the copies of the chunks (400A, 400B, 400C), and the object metadata (136) [7]. The data processor (132) then sends the rebuilt object to the data manager (120) [8]. The data manager (120) then sends the rebuilt object to host A (100A) [9]. After the data manager (120) sends the rebuilt object to host A (100A), the data processor (132) deletes the encryption key and the intermediate key used to decrypt the storage metadata (134) and object metadata (136) [10].

Turning to the third example, consider a scenario in which a data cluster obtains an authorization update request from a data manager to update the authorization information of a user data object stored in a data cluster to include a second user. FIG. 4C shows a diagram of a third example in accordance with one or more embodiments of the invention. Host B (100B) sends a read request to the key manager (140) to generate a user key for a second user. The request includes a second user identifier associated with the second user. In response to obtaining the request, the key manager (140) generates a second user key that is associated with the second user identifier [1].

Host A (100A) then sends an authorization update request to the data manager (120) [2]. The request includes a first user identifier associated with host A (100A) and the second user identifier associated with host B (100B). The request also specifies the user data object for which the authorization information is to be updated. In response to obtaining the request, the data manager (120) identifies the user identifiers and an object ID associated with the authorization update request and sends the authorization update request along with the user identifiers and the object ID to the data processor (132) of the data cluster (130) [3].

The data processor (132) then sends a first intermediate key request to the key manager (140). The first intermediate key request includes the first user identifier and the data cluster identifier. In response to receiving the first intermediate key request, the key manager (140) generates the first intermediate key using a first user key and a data cluster key associated with the first user identifier and the data cluster identifier included in the first intermediate key request. After generating the first intermediate key, the key manager (140) sends the first intermediate key to the data processor (132) [4].

The data processor (132) then generates a first encryption key using the first intermediate key obtained from the key manager (140) and the object ID associated with the authorization update request [5]. After generating the first encryption key, the data processor (132) identifies the storage metadata (134) and object metadata (136) associated with the read request using the object ID. The data processor (132) then decrypts the storage metadata (134) and object metadata (136) using the first encryption key [6].

The data processor (132) then sends a second intermediate key request to the key manager (140). The second intermediate key request includes the first user identifier, the second user identifier, and the data cluster identifier. In response to receiving the second intermediate key request, the key manager (140) generates the second intermediate key using a first user key, a second user key, and a data cluster key associated with the first user identifier, the second user identifier, and the data cluster identifier included in the second intermediate key request. After generating the second intermediate key, the key manager (140) sends the second intermediate key to the data processor (132) [7].

The data processor (132) then generates a second encryption key using the second intermediate key obtained from the key manager (140) and the object ID associated with the authorization update request [8]. After generating the second encryption key, the data processor (132) updates the authorization information included in the object metadata (136) of the user data object associated with the authorization update request to include the second user. The data processor (132) then encrypts the storage metadata (134) and object metadata (136) using the second encryption key [9]. All of the encrypted information included in the storage metadata (134) and object metadata (136) is now depicted within parenthesis with EK2 (i.e., the second encryption key) as a superscript (e.g., (Data Node A: A0)$^{EK2}$). Once the storage metadata (134) and the object metadata (136) are encrypted, the data processor (132) deletes both the first encryption key and the second encryption key as well the intermediate keys that we generated are part of the update request [10].

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the efficiency of securely storing data in a data cluster. In one embodiment of the invention, the efficiency is improved by encrypting metadata associated with data stored in the data cluster with encryption keys. Embodiments of the invention include a data processor that uses object identifiers and intermediate keys obtained from a key manager that were generated using one or more user keys and a data cluster key to generate encryption keys. As a result, data may be stored and provided to users without sharing user keys.

In traditional systems, the data is encrypted using encryption keys.

Embodiments of the invention improve the traditional data clusters by encrypting only the metadata associated with the data. As a result, the latency and computational efficiency of accessing data stored on a data cluster is increased while the security of the data is maintained. Further, embodiments of the invention use encryption keys that are derived using a combination of user identifier, object identifier, and data cluster identifier. In this manner, only a minimal amount of encrypted metadata may be accessible in scenarios in which an encryption key is compromised.

Thus, embodiments of the invention may address the problem of inefficient use of computing resources to store and secure data. This problem arises due to the technological nature of the environment in which data is stored.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for securing data in a data cluster, comprising:

receiving, by the data cluster, a write request for a user to write data to the data cluster, wherein the write request comprises an object identifier (OID) associated with data and a user identifier (UID) associated with the user;

sending, to a key manager, an intermediate key request, wherein the intermediate key request comprises the UID;
receiving, by the data cluster from the key manager, an intermediate key, wherein:
the intermediate key is generated in response to the intermediate key request,
the intermediate key is generated using a data cluster key and a user key,
the user key is obtained using the UID, and
the intermediate key is not persistently stored in the key manager;
processing the data to obtain a plurality of chunks and metadata associated with the plurality of chunks;
generating an encryption key using the intermediate key and the OID;
encrypting the metadata using the encryption key to generate encrypted metadata;
deleting, after generating the encrypted metadata, the encryption key; and
storing the encrypted metadata and the plurality of chunks in the data cluster.

2. The method of claim 1, further comprising:
prior to receiving the write request:
receiving, by the key manager, a data cluster identifier (DCID) from the data cluster;
generating, by the key manager, a data cluster key; and
associating, the DCID with the data cluster key,
wherein the intermediate key request further comprises the DCID.

3. The method of claim 2, further comprising:
prior to receiving the write request:
receiving, by the key manager, the UID from a host operatively connected to the key manager and a data manager;
generating, by the key manager, a user key; and
associating, the UID with the user key.

4. The method of claim 1, further comprising:
receiving, by the data cluster, a read request for the user to read the data from the data cluster, wherein the read request comprises OID associated with data and the UID;
sending, to the key manager, a second intermediate key request, wherein the second intermediate key request comprises the UID;
receiving, by the data cluster from the key manager, the intermediate key;
generating the encryption key using the intermediate key and the OID;
decrypting the encrypted metadata to obtain the metadata;
obtaining the plurality of chunks using the metadata;
deleting, after the decrypting the encrypted metadata, the encryption key; and
providing the plurality of chunks in the data cluster to a data manager.

5. The method of claim 1, further comprising:
receiving, by the data cluster, an authorization update request for the data, wherein the authorization update request comprises OID associated with data and a second UID associated with a second user;
sending, to the key manager, a second intermediate key request, wherein the second intermediate key request comprises the UID;
receiving, by the data cluster from the key manager, the intermediate key;
generating the encryption key using the intermediate key and the OID;
decrypting the encrypted metadata to obtain the metadata;
after the decrypting:
obtaining the UID from the metadata;
ending, to the key manager, a third intermediate key request, wherein the second intermediate key request comprises the UID and the second UID;
receiving, by the data cluster from the key manager, a second intermediate key;
generating a second encryption key using the second intermediate key and the OID;
encrypting the metadata using the second encryption key to generate second encrypted metadata;
deleting, after generating the second encrypted metadata, the second encryption key; and
storing the second encrypted metadata and the plurality of chunks in the data cluster.

6. The method of claim 1, wherein processing the data to obtain the plurality of chunks comprises at least one selected from a grouped consistent of erasure coding and deduplication.

7. The method of claim 1, wherein the metadata comprises at least one selected from a group consisting of storage metadata and object metadata.

8. A system, comprising:
a processor;
a data processor of a data cluster, which when executed by the processor performs a method, the method comprising:
receiving, by the data cluster, a write request for a user to write data to the data cluster, wherein the write request comprises an object identifier (OID) associated with data and a user identifier (UID) associated with the user;
sending, to a key manager, an intermediate key request, wherein the intermediate key request comprises the UID;
receiving, by the data cluster from the key manager, an intermediate key, wherein:
the intermediate key is generated in response to the intermediate key request,
the intermediate key is generated using a data cluster key and a user key,
the user key is obtained using the UID, and
the intermediate key is not persistently stored in the key manager;
processing the data to obtain a plurality of chunks and metadata associated with the plurality of chunks;
generating an encryption key using the intermediate key and the OID;
encrypting the metadata using the encryption key to generate encrypted metadata;
deleting, after generating the encrypted metadata, the encryption key; and
storing the encrypted metadata and the plurality of chunks in the data cluster.

9. The system of claim 8, wherein the method further comprises:
prior to receiving the write request:
receiving, by the key manager, a data cluster identifier (DCID) from the data cluster;
generating, by the key manager, a data cluster key; and
associating, the DCID with the data cluster key,
wherein the intermediate key request further comprises the DCID.

10. The system of claim 9, wherein the method further comprises:
  prior to receiving the write request:
    receiving, by the key manager, the UID from a host operatively connected to the key manager and a data manager;
    generating, by the key manager, a user key; and
    associating, the UID with the user key.

11. The system of claim 8, wherein the method further comprises:
  receiving, by the data cluster, a read request for the user to read the data from the data cluster, wherein the read request comprises OID associated with data and the UID;
  sending, to the key manager, a second intermediate key request, wherein the second intermediate key request comprises the UID;
  receiving, by the data cluster from the key manager, the intermediate key;
  generating the encryption key using the intermediate key and the OID;
  decrypting the encrypted metadata to obtain the metadata;
  obtaining the plurality of chunks using the metadata;
  deleting, after the decrypting the encrypted metadata, the encryption key; and
  providing the plurality of chunks in the data cluster to a data manager.

12. The system of claim 8, wherein the method further comprises:
  receiving, by the data cluster, an authorization update request for the data, wherein the authorization update request comprises OID associated with data and a second UID associated with a second user;
  sending, to the key manager, a second intermediate key request, wherein the second intermediate key request comprises the UID;
  receiving, by the data cluster from the key manager, the intermediate key;
  generating the encryption key using the intermediate key and the OID;
  decrypting the encrypted metadata to obtain the metadata;
  after the decrypting:
    obtaining the UID from the metadata;
    ending, to the key manager, a third intermediate key request, wherein the second intermediate key request comprises the UID and the second UID;
    receiving, by the data cluster from the key manager, a second intermediate key;
    generating a second encryption key using the second intermediate key and the OID;
    encrypting the metadata using the second encryption key to generate second encrypted metadata;
    deleting, after generating the second encrypted metadata, the second encryption key; and
    storing the second encrypted metadata and the plurality of chunks in the data cluster.

13. The system of claim 8, wherein processing the data to obtain the plurality of chunks comprises at least one selected from a grouped consistent of erasure coding and deduplication.

14. The system of claim 8, wherein the metadata comprises at least one selected from a group consisting of storage metadata and object metadata.

15. A non-transitory computer readable medium comprising computer readable program code, which when executed by a computer processor enables the computer processor to perform a method, the method comprising:
  receiving, by a data cluster, a write request for a user to write data to the data cluster, wherein the write request comprises an object identifier (OID) associated with data and a user identifier (UID) associated with the user;
  sending, to a key manager, an intermediate key request, wherein the intermediate key request comprises the UID;
  receiving, by the data cluster from the key manager, an intermediate key, wherein:
    the intermediate key is generated in response to the intermediate key request,
    the intermediate key is generated using a data cluster key and a user key,
    the user key is obtained using the UID, and
    the intermediate key is not persistently stored in the key manager;
  processing the data to obtain a plurality of chunks and metadata associated with the plurality of chunks;
  generating an encryption key using the intermediate key and the OID;
  encrypting the metadata using the encryption key to generate encrypted metadata;
  deleting, after generating the encrypted metadata, the encryption key; and
  storing the encrypted metadata and the plurality of chunks in the data cluster.

16. The non-transitory computer readable medium of claim 15, wherein the method further comprises:
  prior to receiving the write request:
    receiving, by the key manager, a data cluster identifier (DCID) from the data cluster;
    generating, by the key manager, a data cluster key; and
    associating, the DCID with the data cluster key,
    wherein the intermediate key request further comprises the DCID.

17. The non-transitory computer readable medium of claim 16, wherein the method further comprises:
  prior to receiving the write request:
    receiving, by the key manager, the UID from a host operatively connected to the key manager and a data manager;
    generating, by the key manager, a user key; and
    associating, the UID with the user key.

18. The non-transitory computer readable medium of claim 15, wherein the method further comprises:
  receiving, by the data cluster, a read request for the user to read the data from the data cluster, wherein the read request comprises OID associated with data and the UID;
  sending, to the key manager, a second intermediate key request, wherein the second intermediate key request comprises the UID;
  receiving, by the data cluster from the key manager, the intermediate key;
  generating the encryption key using the intermediate key and the OID;
  decrypting the encrypted metadata to obtain the metadata;
  obtaining the plurality of chunks using the metadata;
  deleting, after the decrypting the encrypted metadata, the encryption key; and
  providing the plurality of chunks in the data cluster to a data manager.

* * * * *